US010479436B2

(12) United States Patent
Kosco et al.

(10) Patent No.: US 10,479,436 B2
(45) Date of Patent: *Nov. 19, 2019

(54) COLLAPSIBLE VEHICLE

(71) Applicant: Pride Mobility Products Corporation, Exeter, PA (US)

(72) Inventors: James M. Kosco, West Wyoming, PA (US); Charles J. Martis, Harding, PA (US); Sterling G. Lamoreux, III, Harveys Lake, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/349,909

(22) Filed: Nov. 11, 2016

(65) Prior Publication Data

US 2017/0057587 A1    Mar. 2, 2017
US 2019/0291808 A9   Sep. 26, 2019

Related U.S. Application Data

(63) Continuation of application No. 14/086,430, filed on Nov. 21, 2013, now Pat. No. 9,522,711, which is a
(Continued)

(51) Int. Cl.
*B62K 15/00* (2006.01)
*B62K 5/025* (2013.01)
(Continued)

(52) U.S. Cl.
CPC ............ *B62K 15/008* (2013.01); *B62K 5/025* (2013.01); *B62K 5/027* (2013.01); *B62K 15/006* (2013.01); *H01M 2/1072* (2013.01)

(58) Field of Classification Search
CPC ...... B62K 15/008; B62K 5/027; B62K 5/025; B62K 15/006; H01M 2/1072
See application file for complete search history.

(56) References Cited

U.S. PATENT DOCUMENTS 2,619,364 A * 11/1952 Samuel ................... B62K 9/02
280/287
3,004,619 A    10/1961 Straussler
(Continued)

FOREIGN PATENT DOCUMENTS

DE    299 17 475 U1    1/2000
EP    0 362 033 A1    4/1990
(Continued)

*Primary Examiner* — Paul N Dickson
*Assistant Examiner* — Joselynn Y Sliteris
(74) *Attorney, Agent, or Firm* — BakerHostetler

(57) ABSTRACT

A powered vehicle has a rear frame assembly and a front frame assembly that are pivotally attached to one another, and can be pivoted from a normal fully-extended operating position to a folded position in which the frame assemblies are positioned substantially adjacent to one another, effectively reducing overall vehicle length to about half. One or more latch members lock the front and rear frame assemblies in the fully-extended, normal operating position, and they may be used to lock the frame assemblies in the folded position. The seat support structure may be integrated with the front and rear frame assemblies such that pivoting the frame assemblies toward the folded position collapses the seat support. The steering tiller may also be collapsible toward the front frame assembly. The rear wheels may be mounted on a transaxle that is pivotally mounted on the rear frame assembly. An extendable handle may be provided to assist in the folding operation and to tow the collapsed vehicle on its anti-tip rollers.

10 Claims, 25 Drawing Sheets

Related U.S. Application Data continuation of application No. 13/112,063, filed on May 20, 2011, now abandoned, which is a continuation of application No. 11/385,339, filed on Mar. 21, 2006, now Pat. No. 7,967,095, which is a continuation-in-part of application No. 10/960,742, filed on Oct. 7, 2004, now abandoned.

(60) Provisional application No. 60/509,494, filed on Oct. 8, 2003.

(51) Int. Cl.
*B62K 5/027* (2013.01)
*H01M 2/10* (2006.01)

(56) References Cited

U.S. PATENT DOCUMENTS

| | | | |
|---|---|---|---|
| 3,710,965 A | 1/1973 | Joosten | |
| 4,026,573 A | 5/1977 | Richardson | |
| 4,087,108 A | 5/1978 | Winchell | |
| 4,111,447 A | 9/1978 | Ishida | |
| 4,457,529 A * | 7/1984 | Shamie | B62K 5/02 280/278 |
| 4,462,606 A | 7/1984 | Hon | |
| 4,570,739 A | 2/1986 | Kramer | |
| 4,909,525 A | 3/1990 | Flowers | |
| 5,036,938 A | 8/1991 | Blount et al. | |
| 5,186,482 A | 2/1993 | Sapper | |
| 5,240,086 A | 8/1993 | Hopely, Jr. | |
| 5,277,267 A | 1/1994 | Tiffany et al. | |
| 5,312,126 A | 5/1994 | Shortt et al. | |
| 5,467,838 A | 11/1995 | Wu | |
| 5,937,623 A | 8/1999 | Wolf | |
| 6,016,882 A | 1/2000 | Ishikawa | |
| 6,095,270 A | 8/2000 | Ishikawa | |
| 6,152,476 A * | 11/2000 | Huang | B62B 7/08 188/20 |
| 6,183,002 B1 | 2/2001 | Choi et al. | |
| 6,196,566 B1 | 3/2001 | Zhang | |
| 6,364,335 B1 | 4/2002 | Mombelli | |
| 6,575,486 B2 * | 6/2003 | Ma | B62K 9/02 280/282 |
| 6,695,081 B2 | 2/2004 | Chu et al. | |
| 6,799,771 B2 | 10/2004 | Bigot | |
| 6,845,830 B2 | 1/2005 | Tojo et al. | |
| 6,979,013 B2 * | 12/2005 | Chen | B62K 15/008 280/278 |
| 7,363,998 B2 | 4/2008 | Fan | |
| 7,380,778 B2 | 6/2008 | Lawrence et al. | |
| 7,401,675 B2 | 7/2008 | Chang | |
| 7,413,045 B2 | 8/2008 | Tien | |
| 7,451,848 B2 | 11/2008 | Flowers et al. | |
| 7,886,855 B2 * | 2/2011 | Wang | A61G 5/045 180/65.1 |
| 7,967,095 B2 | 6/2011 | Kosco et al. | |
| 8,267,210 B2 | 9/2012 | Jones et al. | |
| 8,746,730 B2 * | 6/2014 | Wu | B62K 15/008 280/639 |
| 9,265,675 B2 | 2/2016 | Ransenberg et al. | |
| 9,301,893 B1 | 4/2016 | Wu | |
| 9,302,691 B2 * | 4/2016 | Cheng | B62B 3/02 |
| 2002/0139591 A1 | 10/2002 | Wisecarver | |
| 2003/0141121 A1 | 7/2003 | Flowers et al. | |
| 2003/0141695 A1 * | 7/2003 | Chen | B62K 9/02 280/287 |
| 2003/0218373 A1 | 11/2003 | Etzioni et al. | |
| 2004/0144580 A1 | 7/2004 | Wu | |
| 2005/0077097 A1 | 4/2005 | Kosco | |
| 2016/0089285 A1 * | 3/2016 | Cheng | B62K 5/007 180/58 |
| 2018/0271726 A1 * | 9/2018 | Wang | A61G 5/0841 |
| 2019/0168837 A1 * | 6/2019 | Zhang | B62K 21/16 |

FOREIGN PATENT DOCUMENTS

| | | |
|---|---|---|
| EP | 0 464 982 | 1/1992 |
| EP | 0 505 598 A1 | 9/1992 |
| EP | 1 193 170 A1 | 4/2002 |
| EP | 1 441 401 A1 | 7/2004 |
| GB | 1 250 876 | 10/1971 |
| GB | 1 571 849 | 7/1980 |
| GB | 2 332 403 | 6/1999 |
| JP | 59-73373 | 4/1984 |
| WO | WO 02/45539 | 6/2002 |
| WO | WO 02/051697 | 7/2002 |

* cited by examiner

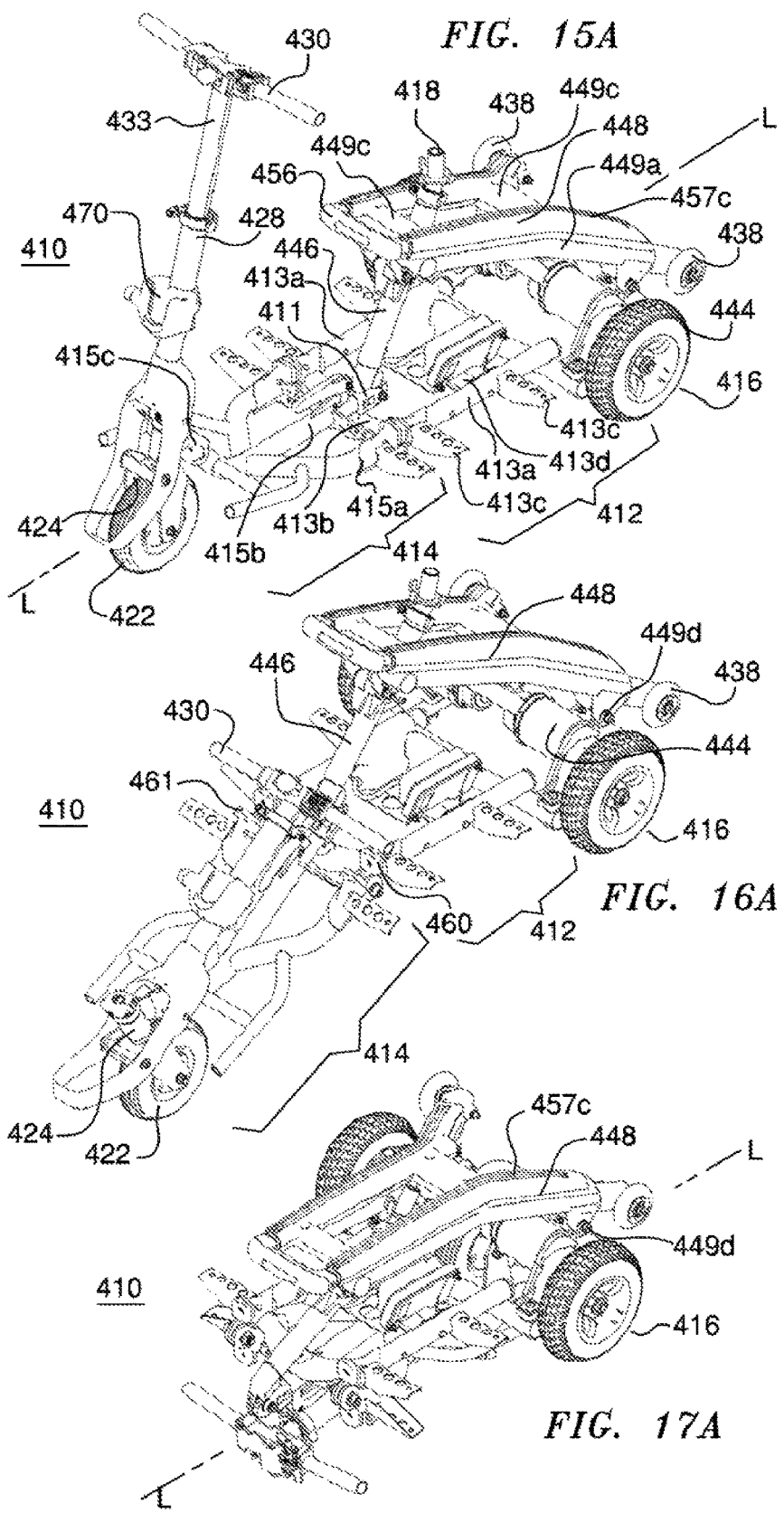

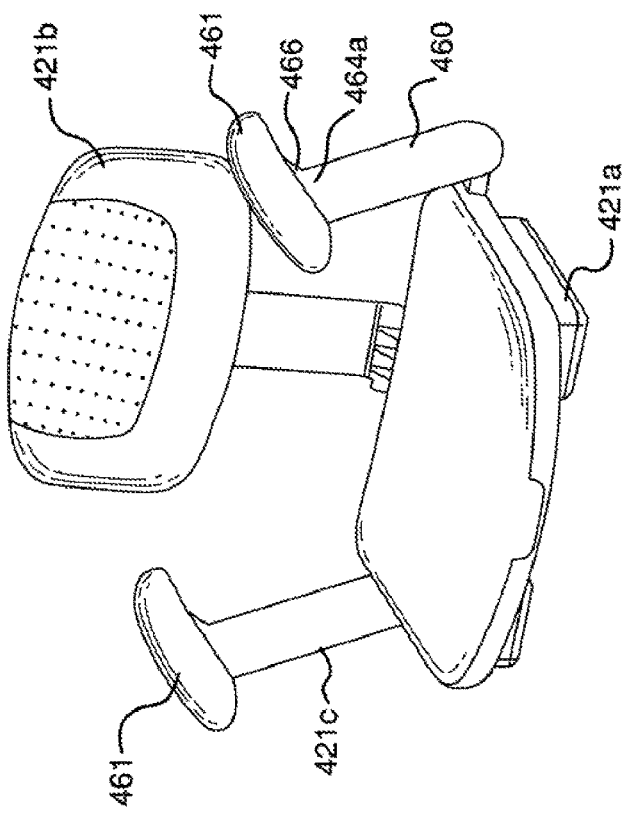
FIG. 27
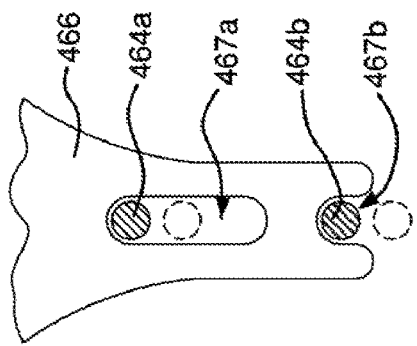
FIG. 29
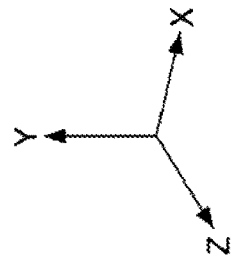

COLLAPSIBLE VEHICLE

RELATED APPLICATION

This application is a continuation of U.S. patent application Ser. No. 14/086,430, filed Nov. 21, 2013, which is a continuation of U.S. patent application Ser. No. 13/112,063, filed May 20, 2011, which is a continuation of U.S. patent application Ser. No. 11/385,339, filed Mar. 21, 2006, now issued as U.S. Pat. No. 7,967,095, which is a continuation in part of U.S. patent application Ser. No. 10/960,742, filed Oct. 7, 2004, which claims the benefit of provisional patent application No. 60/509,494, filed Oct. 8, 2003, the contents of each of which are incorporated herein by reference in their entirety.

FIELD OF THE INVENTION

The invention relates to the field of powered vehicles, such as personal mobility vehicles and scooter type vehicles.

BACKGROUND OF THE INVENTION

Personal mobility vehicles are increasingly used by aged or infirm individuals who need assistance in moving about. Such vehicles typically have three or four main wheels for stability, and may have additional anti-tip rollers. They are limited in speed and other aspects for reasons commensurate with the reduced physical ability of the rider. While some regulatory bodies differentiate between scooters used as personal mobility vehicles and faster or larger personal mobility vehicles, no such differentiation is intend in this description. Nor is the invention limited to personal mobility vehicles for the aged and infirm. Many available personal mobility vehicles include separable components to make them easier to store and transport. Typically the seat, batteries, rear motor assembly and front deck assembly of the frame can be separated from one another, and the steering tiller may be folded toward the frame.

It is contemplated that a personal vehicle wherein the various parts remain substantially integrated, but are capable of being folded or collapsed into a compact profile, would have some advantages over prior vehicles with separable components. The need for such a vehicle is addressed by the present invention.

SUMMARY OF THE INVENTION

Aspects of the invention include a personal mobility vehicle having a rear frame assembly and a front frame assembly that are pivotally attached to one another. One or more latch members are provided for locking the front and rear frame assemblies in the fully-extended, normal operating position, and they may be used to lock the frame assemblies in various pivoted positions, including the fully-folded position in which the frame assemblies are positioned substantially adjacent to one another, effectively reducing overall vehicle length to about half. A lift handle may be provided either on the front or the rear frame assemblies near the pivot connections to assist in collapsing the vehicle.

A seat support structure is attached to and supported by the rear frame assembly. Another aspect of the invention includes that the seat support structure can be collapsed onto the rear frame assembly. The vehicle may have a latch member for locking the seat support structure in the raised normal operating position and a latch member to lock the structure in the collapsed position, and the same latch member may perform both functions. The latch member for locking the front and rear frame assemblies may also be the same mechanism used to lock the seat support structure. The pivotal connection for the seat support structure may be arranged in such manner that the folding of the first and second frame assemblies causes the collapse of the seat support structure.

A steering tiller is operatively connected to the front steering wheel. Another aspect of the invention includes that the steering tiller may be easily disconnected at its lower end from the front steering wheel, and then pivoted back against the front frame member, again with the objective of a compact profile for storage and transport.

Vehicles using the invention may include one or more motor drive units, typically battery powered electric motors. The motor drive(s) may be operatively connected to one or both of rear wheels or to a forward steering wheel. Another aspect of the invention includes an embodiment wherein the rear wheels and/or drive motor(s) may be mounted on an axle that is pivotally connected to the rear frame assembly, such that the axle can be unlatched and pivoted into the rear frame assembly to reduce the overall profile.

The vehicle may have rear anti-tip rollers. Another aspect of the invention includes that anti-tip rollers may be positioned to extend beyond the end of the vehicle when it is collapsed, such that the rollers can be used to as trundles to tow the folded vehicle. In this configuration, the lift handle near the pivot connections of the front and rear frame assemblies is vehicle is preferably an extendable handle. This allows the handle to be extended above the bulk of the collapsed vehicle and used to tow the vehicle on the anti-tip rollers.

The latch member for locking and unlocking the pivotal joints may be any suitable form of latching mechanism. For example, it may be in the form of a latch having a spring biased pin which inserts through one of the frame assemblies and engages a slot on the other frame assembly. Removal of the pin from the retainer permits the frame assemblies to pivot in order to collapse the vehicle. A second pin receiving retainer may be provided at a different location on the latch for locking the folded frame assemblies in the collapsed position.

According to another embodiment, a foldable scooter includes a frame that is foldable from an open configuration to a folded configuration, a seat coupled to the frame, a pair of rear wheels and at least one front wheel, at least one motor for driving the wheelchair, and at least one battery for providing power to the at least one motor. Preferably each wheel has a dedicated motor and the scooter includes a pair of batteries. Each battery includes a casing, a handgrip, an electrical connector, and a battery retaining surface.

The scooter also includes a battery compartment for receiving the battery. The battery compartment preferably is formed as part of a cover and includes an electrical connector, a retaining surface capable of contacting the battery retaining surface, and a spring loaded latch for securing the battery relative to the battery compartment upon engagement of the electrical connectors. The retaining surfaces may be tabs and corresponding slots formed respectively on the battery casing and in the slots. Alternatively, the tabs may be formed on the battery compartment and the slots or guides may be formed in the battery casing. The battery is capable of being inserted into the battery compartment while the frame is in its open configuration and is capable of being removed in either the open or folded configuration of the frame.

Preferably, a latch for retaining the battery in the battery compartment includes a pin that is spring loaded toward an extended position. And the battery compartment includes an aperture to receive the pin in a vertical orientation (while the scooter is in its open position). Grasping and pulling the handle, or even lifting the handle, may relieve the spring force such that the pin disengages from the battery compartment aperture. Upon vertical actuation of the pin, the battery may be removed by sliding the battery longitudinally as guided by the tabs and grooves. Preferably, a terminal portion of each slot is substantially perpendicular to the direction of actuation of the pin. And the slots have at least two non-parallel portions such that the battery tabs change direction while the battery is inserted therethrough.

According to another embodiment, a foldable scooter includes a foldable frame assembly, a front wheel, a pair of rear wheels, a tiller, and a seat frame. The foldable main frame assembly includes a front frame, a rear frame, and a main pivot functionally connected between the front frame and the rear frame. Each of the front and rear frames preferably includes a pressure plate, and the opposing pressure plates are in contact to limit movement of the frame past its open position. The main latch mechanism and the hinges that form the main pivot also limit the movement of the frame past its open position.

The seat frame includes at least one front seat support member and at least one rear seat support member that extend upwardly from the frame assembly while the frame assembly is in its open position. The front seat support member is coupled to the front frame at a secondary pivot that is spaced apart from the main pivot such that actuating the frame assembly from its open position to its folded position draws at least a portion of the front seat support member toward the rear frame and draws at least a portion of the rear seat support member toward the rear frame. The secondary pivot preferably is located higher than and rearward of the main pivot while the scooter is in its open position; the front seat support member has a first end coupled at the secondary pivot and a second end pivotally coupled to the rear seat support member. And actuating the frame assembly from its open position to its closed position draws the front seat support member first end frontward relative to the rear frame and an upper portion of the rear seat support member downward relative to the rear frame.

A latch assembly for retaining the scooter in its open position includes a retractable pin on one of the front frame and the rear frame and a first recess in an other of the front frame and the rear frame. The pin is biased toward engagement of the first recess and the engagement of the pin in the first recess at least partially retains the scooter in its open position. The latch preferably includes a clasp in which the first recess is formed. And the clasp further includes a second recess, such that engagement of the pin in the second recess at least partially retains the scooter in the closed position. The clasp includes a sliding surface between the first and second recesses, and the pin moves across the sliding surface while the scooter is moved between its open and folded positions.

According to another aspect, the scooter includes a handle assembly that is coupled to the frame assembly, preferably on the rear support, and is accessible while the scooter is in its folded position. The handle assembly includes a telescoping handle capable of being gripped to enable a user to wheel the scooter in its folded position. A pair of rollers, preferably separate from the anti-tip wheels, enables the folded scooter to be pulled by the handle. An outer shell or posterior of the handle assembly forms a skid surface for enabling the scooter to be moved over stair treads. The skid surface and rollers are configured to eliminate a gap therebetween.

According to another aspect, the scooter includes a foldable chair that is removably coupled to the seat frame while the scooter is in its open position. The chair includes a base, a back, a pair of arm rests, and a pair of arm rest supports. The base includes a top surface that is a seat. The back extends from the base and is hinged and foldable relative to the seat. The arm rest supports extend from the base and are pivotable relative to the base. The arm rests extend from the arm rest supports and are pivotable relative to the arm rest supports. The back, arm rest supports, and arm rests are capable of folding to form a chair folded position.

The arm rest includes at least one slot and the arm rest support includes at least one pin that is insertable into the slot. The arm rest is located in its functional position while the pin is located in a first position in the slot, and the arm rest is capable of being pivoted toward the arm rest support while the pin is located in a second position in the slot. The base includes a cloverleaf flange that mates with a corresponding cloverleaf structure located on the seat frame while the scooter is in its open position. The cloverleaf flange fits into a receptacle having a slotted opening located on the tiller.

According to another aspect, a method of folding and unfolding a scooter comprises the steps of: (a) providing a scooter having a front frame, a rear frame, a main pivot functionally connected between the front frame and the rear frame, a seat frame, and a tiller that is pivotally connected to the front frame; (b) releasing a tiller latch while the scooter is in its open position to enable the tiller to fold toward the front frame; (c) releasing a main first latch while the scooter is in its open position to enable the front and rear frame to move about the main pivot; and (d) lifting an intermediate portion of the scooter while the scooter is in its open position to pivot the front frame relative to the rear frame about the main pivot and drawing the seat frame toward the rear frame until the scooter reaches its folded position.

The method also encompasses engaging (and subsequently releasing) a second latch to retain (and then release) the scooter in its folded position where the second latch is formed by a single spring-biased pin and a pair of opposing recesses formed on a clasp.

Other aspects and advantages of the features of the invention will become apparent by reviewing the description of the drawings provided herewith.

BRIEF DESCRIPTION OF THE DRAWINGS

For the purpose of illustrating the invention, there is shown in the drawings various forms that are presently preferred. It being understood, however, that this invention is not limited to the precise arrangements and constructions particularly illustrated.

FIG. 15A is a perspective view of another embodiment of the vehicle shown in its operational configuration with the seat assembly removed for clarity;

FIG. 16A is a perspective view of the vehicle of FIG. 15A in a partially folded configuration;

FIG. 17A is a perspective view of the vehicle of FIG. 15A shown in its folded configuration;

FIG. 27 is a perspective view of a seat assembly for use with the scooter of FIG. 15A;

FIG. 29 is an enlarged view of a component of the seat assembly;

DETAILED DESCRIPTION OF THE DRAWINGS

Figure 1:
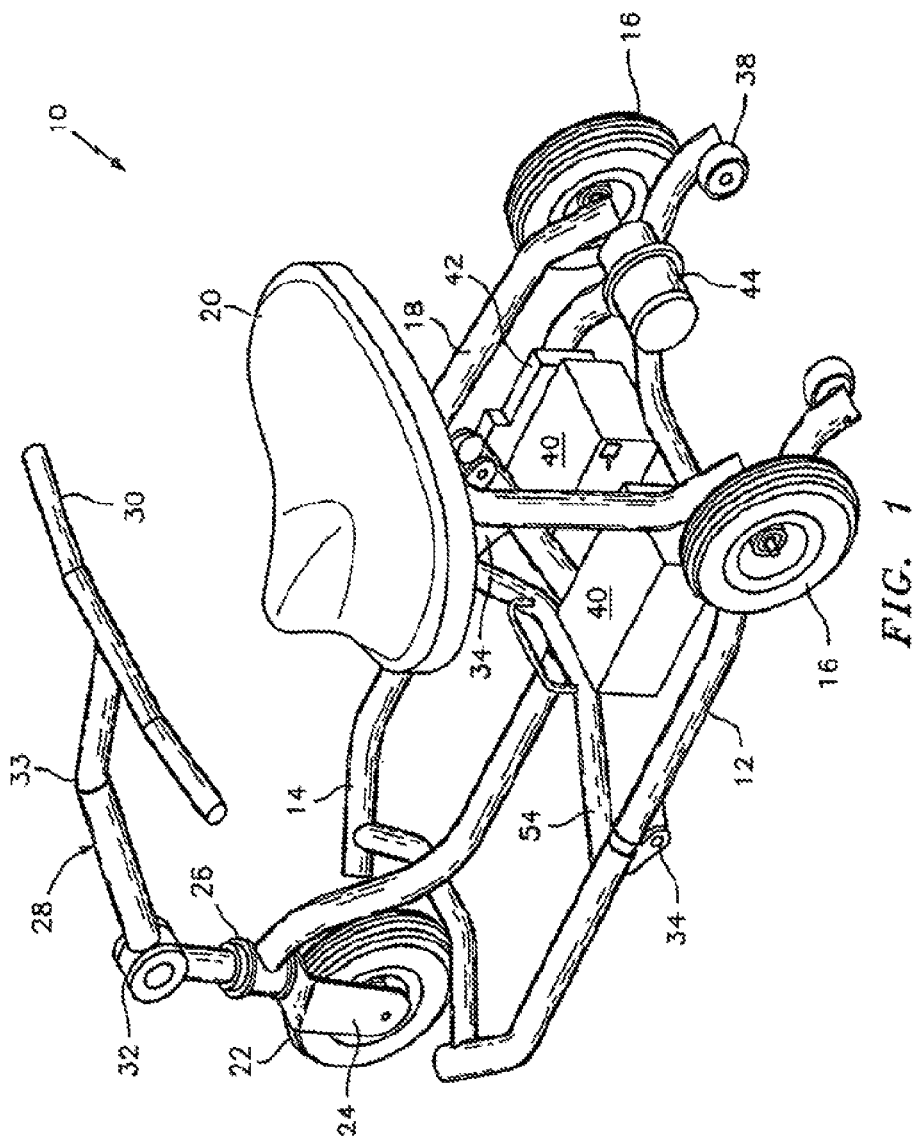
FIG. 1 is a rear perspective view of a personal vehicle with various frame coverings removed to expose the frame and features of the invention.

Referring now to the drawings, wherein like reference numerals identify like elements, FIG. 1 depicts a personal vehicle 10 from which various body covering panels have been removed to expose the frame and features of the invention. The vehicle 10 includes a rear frame assembly 12 and a front frame assembly 14. The rear frame assembly 12 supports two rear wheels 16. A seat support structure 18 is provided to support a seat 20 in an elevated position above the vehicle base. The seat may be detachable from the seat support. A front steering wheel 22 is supported by the front frame assembly 14. The steering wheel 22 is mounted in a wheel fork 24 which is rotationally supported in a collar 26 that is secured to the front frame assembly 14. A steering tiller 28 extends upwardly from the collar 26 to a handle bar 30. The tiller 28 may include an adjustment hinge 32 for adjusting the angle of the tiller, and thus the height and proximity of the handlebar 30 to the seat 20. The tiller 28 may further be length-adjustable by a telescoping section 33.

The front and rear frame assemblies are pivotally connected to each other by hinges 34. A latch mechanism (which is more particularly discussed below in reference to more detailed drawings) is used to lock the front and rear frame assemblies in the fully-extended, normal operating position. When the latch is unlocked, the front and rear frame assemblies can be pivoted at the hinges 34 into a folded position in which the frame assemblies are positioned substantially adjacent to one another, effectively reducing overall length of the vehicle to about half.

The front and rear frame assemblies 12, 14 may be formed of hollow tubular metal members welded together to form a rigid structure. The rear frame assembly 12 may extend beyond the rear wheels to mount rear anti-tip rollers 38. A pair of batteries 40 and an electric power controller 42 may be positioned below the seat support structure 18 and seat 20. A drive motor 44 is connected to one or both of the rear wheels 16.

Figure 2:
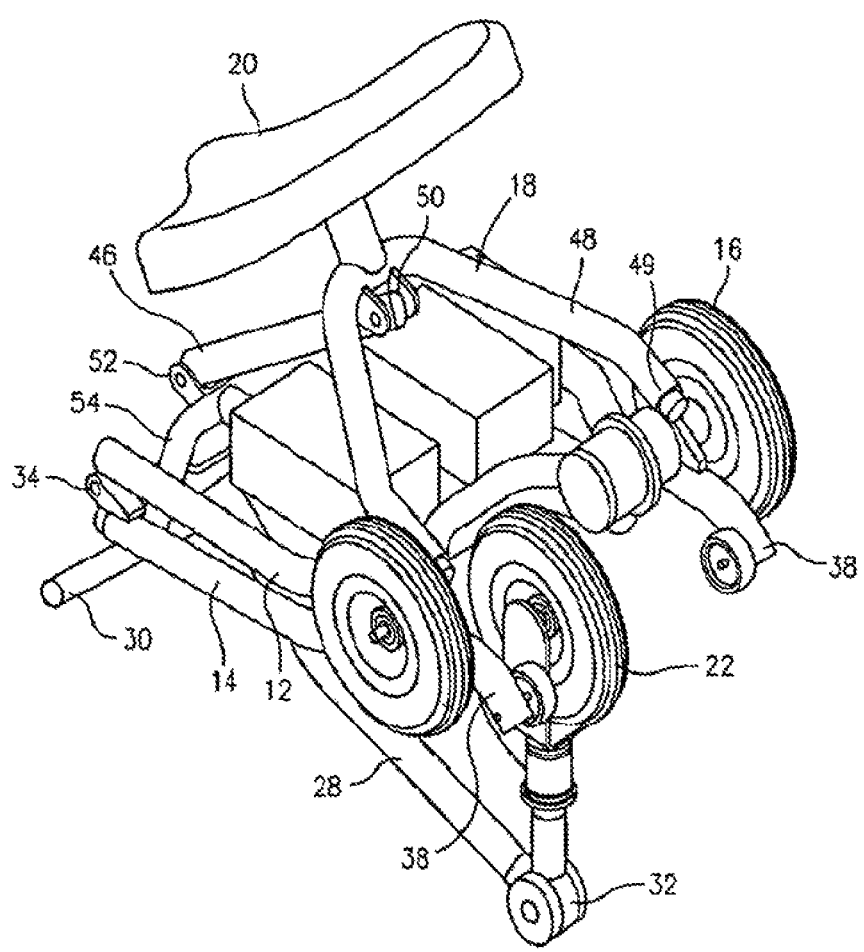
FIG. 2 is a rear perspective view of the vehicle shown in FIG. 1, wherein the front and rear frame assemblies have been folded together.

In FIG. 2, the vehicle 10 is shown in a partially collapsed condition wherein the front frame assembly 14 is positioned closely adjacent the rear frame assembly 12 after they have been pivoted about the hinges 34. In addition, the steering tiller 28 has been placed in a collapsed condition by adjusting the angle of the adjustment hinge 32 and shortening the length by using the telescoping joint 33. The seat support structure may also collapse onto the rear frame assembly, as described hereafter.

FIG. 2 shows that the seat support structure 18 may generally comprise a tubular front support member 46 aligned with the vehicle's longitudinal centerline and extending back from the front center of the rear frame assembly, in conjunction with a bipod support member 48 extending from an apex under the seat post to two projected ends 49, giving the seat support structure 18 a tripod configuration. The ends of the bipod member are pivotally connected to the rear frame near the rear wheels, such as by a rotational attachment to the wheel axles. This attachment of the distal ends of the seat support bipod member 48 allows the bipod member 48 to rotate from the upright riding position to a collapsed position.

The front seat support member 46 is pivotally attached to the bipod member 48 and to the front frame assembly in a manner that allows the folding of the first and second frame assemblies to cause the seat support structure to collapse. The front support member 46 is pivotally attached to the bipod member 48 by a yoke and pin hinged connection 50. The opposite end of the front seat support member 46 is pivotally attached to a transverse member 54 of the front frame assembly 14 by a yoke and pin hinged connection 52. Thus, when the front and rear frame assemblies are pivoted into alignment for normal operation, the front seat support member 46 raises the seat support structure 18 to the normal riding position. Conversely, when the front frame assembly is folded to lie adjacent the rear frame, the front seat support member 46 allows the seat support structure 18 to collapse against the rear frame assembly. To make this folding operation from the normal extended position easier to accomplish, a lift handle 56 may be provided that extends upward from the transverse member 54 of the front frame assembly, or from some other convenient location near the hinged connection between the front and rear frame assemblies.

Figure 4:
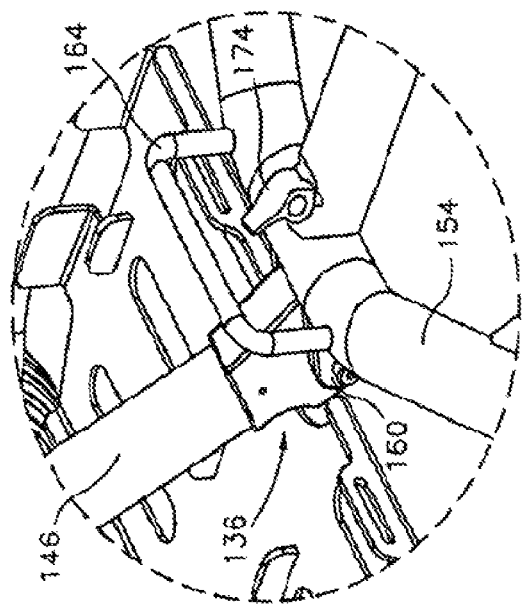
FIG. 4 shows an enlarged view of the connection between the front and rear frame assemblies of the vehicle of FIG. 3.
Figure 3:
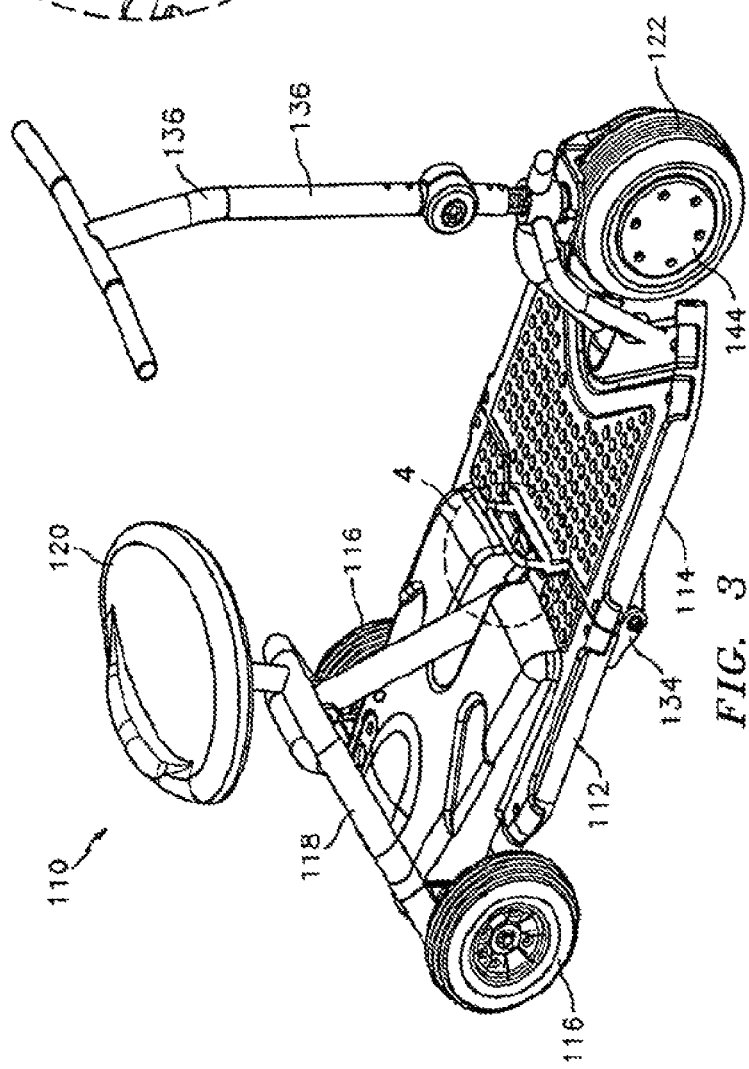
FIG. 3 is a front perspective view of an embodiment of a personal vehicle using a front wheel motor drive and aspects of the invention.

FIGS. 3 and 4 illustrate another embodiment of a personal utility vehicle 110, in which the drive motor is associated with the front steering wheel assembly 122. Like the previous embodiment, it has a rear frame assembly 112 and a front frame assembly 114, rear wheel assemblies 116, a seat support structure 118, a seat 120, a front steering wheel 122 and a steering tiller 128. This embodiment is depicted with its floor panels and other frame covers that were removed from the embodiment of FIGS. 1 and 2, but it will be understood that the frames of both vehicles are largely the same. The rear frame assembly 112 is pivotably attached to the front frame assembly 114 by hinges 134. There is a hinged connection 160 between a crossing member 154 of the front frame assembly 114 and the forward support member 146 of the seat support 118. A latching mechanism 136 may be associated with this hinged connection. The floor panel and battery cover allow sufficient opening around the hinged connection 160 to allow the user manual access to a latch actuator 174 for the latching mechanism.

Figure 7:
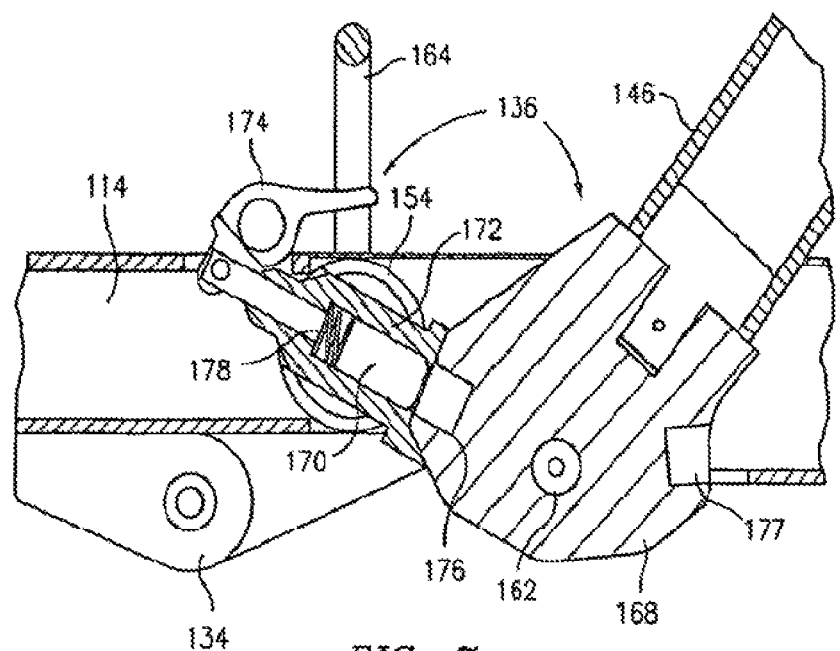
FIG. 7 is a cross-sectional view of a portion of the front and rear frame assemblies showing details of the latch mechanism for locking and releasing the front and rear frame assemblies and seat support.
Figure 8:
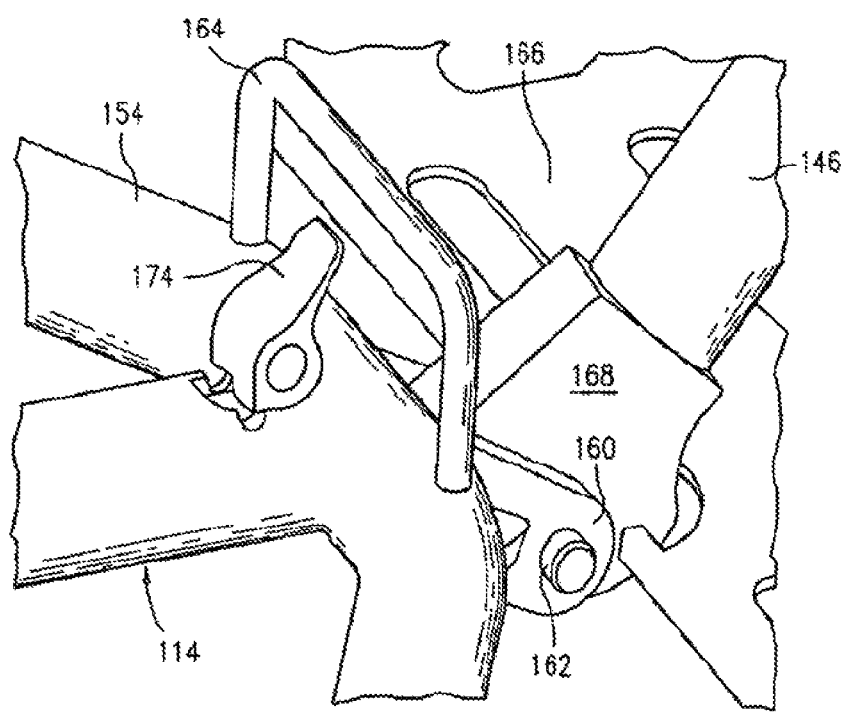
FIG. 8 is an external view of a portion of the front and rear frame assemblies showing the latch mechanism.

The latch mechanism 136 of this embodiment is shown in FIG. 7 (cross-section). The latch mechanism generally comprises an abutment fitting 168 at the end of the front seat support member 146 that attaches to a yoke 160 and pin 162 hinge on the front frame 114. The fitting 168 can rotate around the hinge pin 162 to abut against the transverse crossing member 154 to prevent the front and rear frames from over-rotating past the aligned normal driving position. A retaining slot 176 in the fitting 168 is adapted to receive a locking pin 170, which is mounted in a sleeve 172 positioned within the crossing member 154. The sleeve also encloses a spring 178 to push the pin 170 into the slot 176. An activation lever 174 provided on the front frame assembly 114 is operatively connected to the locking pin such that operating the lever withdraws the pin 170 from the slot 176 and allows the fitting 168 to rotate around the hinge pin 162 when the front frame is lifted by the handle 164. The fitting 168 may have a second retaining slot 177 positioned to receive the locking pin 170 when the front and rear frame assemblies are folded together, thus locking them in that position until the actuation lever 174 is again moved to release the fitting 168 to rotate.

Figure 5:
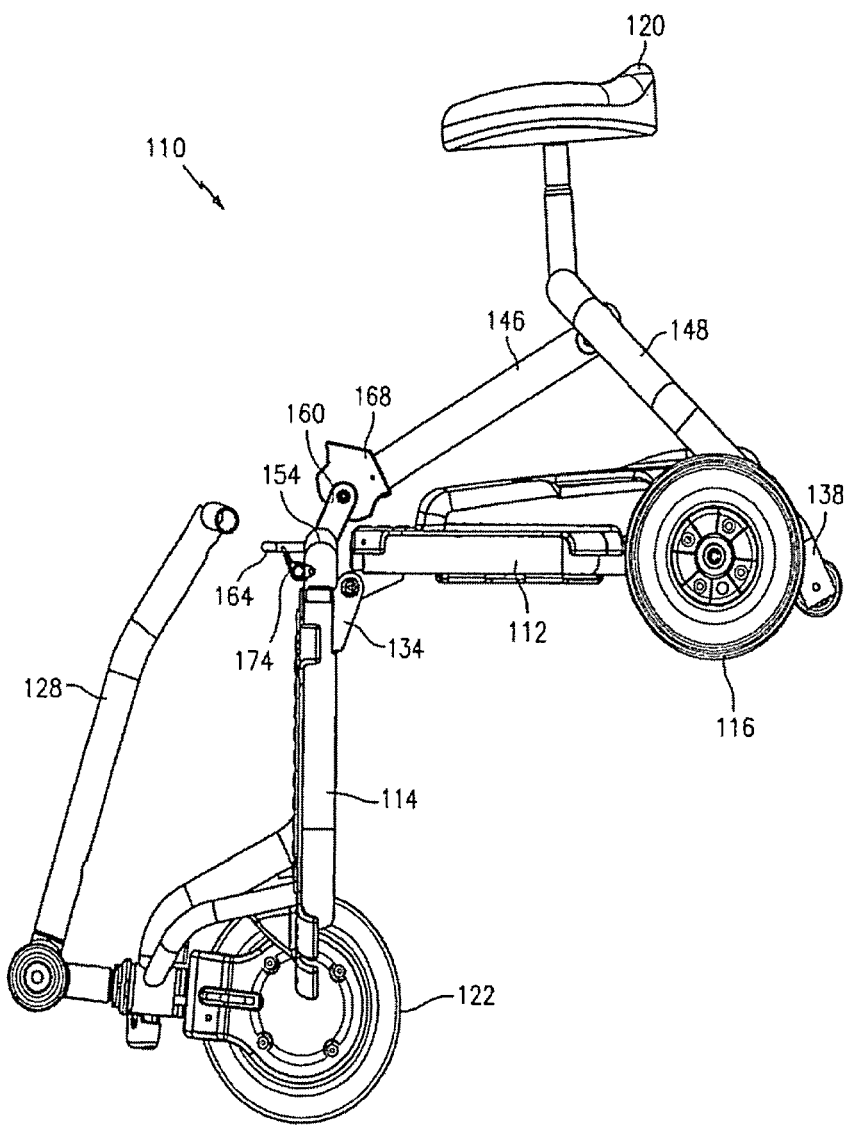
FIG. 5 is a side view of the vehicle of FIG. 4 wherein the frame assemblies are pivoted at a 90 degree angle with respect to one another.
Figure 6:
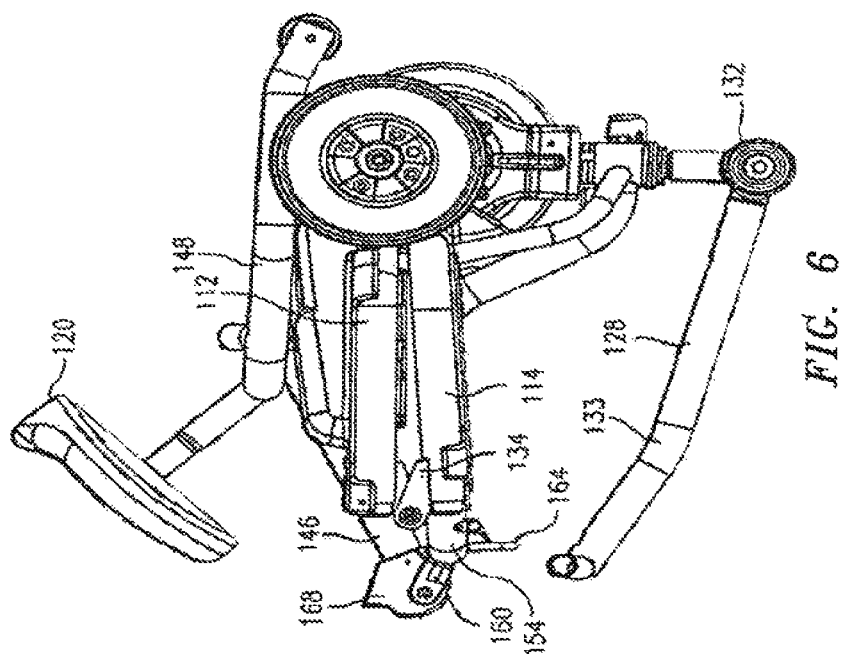
FIG. 6 is a side perspective view of the vehicle shown in FIGS. 4 and 5 wherein the front and rear frame assemblies are folded together and the seat support structure is collapsed onto the rear frame assembly.
Figure 9:
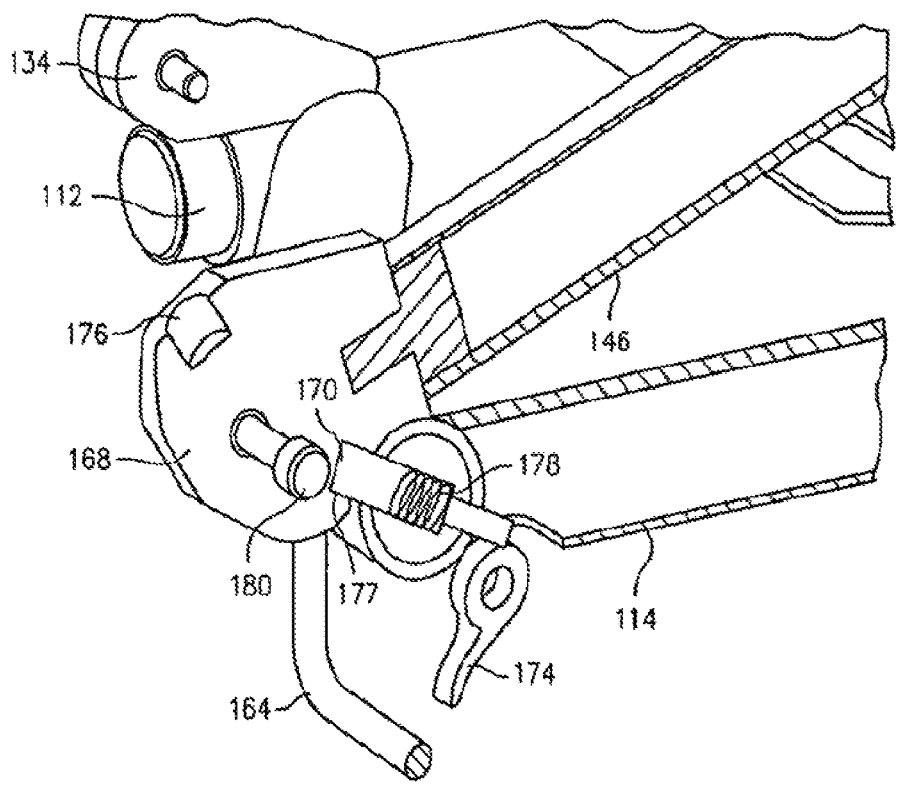
FIG. 9 is a cross-sectional perspective view of the latch mechanism with the frame assemblies in the collapsed position.

FIG. 5 depicts the vehicle 110 partially folded. The latch actuator 174 was operated to unlatch the latch mechanism 136 and allow the abutment fitting 168 to rotate in the yoke 160. This unlatching also frees the frame hinges 134. The front frame assembly can be lifted by the handle 164 to start the folding at the hinges 134. At the same time, the movement of the front frame cross member 154 away from the seat support assembly allows the seat support to collapse onto the rear frame assembly. The actuator lever 174 can be released while the frame assemblies are being folded, and the spring will lock the latch mechanism when the pin 170 is aligned with the slot 177, in the collapsed position shown in FIGS. 6 and 9. The steering tiller 128 can be collapsed toward the front frame assembly and shortened, as shown in FIG. 6, by loosening and adjusting the angle of the adjustment hinge 132 and shortening the length by using the telescoping joint 133.

There are, of course, many types of latching mechanisms that could be used instead of the locking pin and abutment fitting with slots as descried in this embodiment. The invention is not intended to be limited by the type of latching mechanism.

Figure 10:
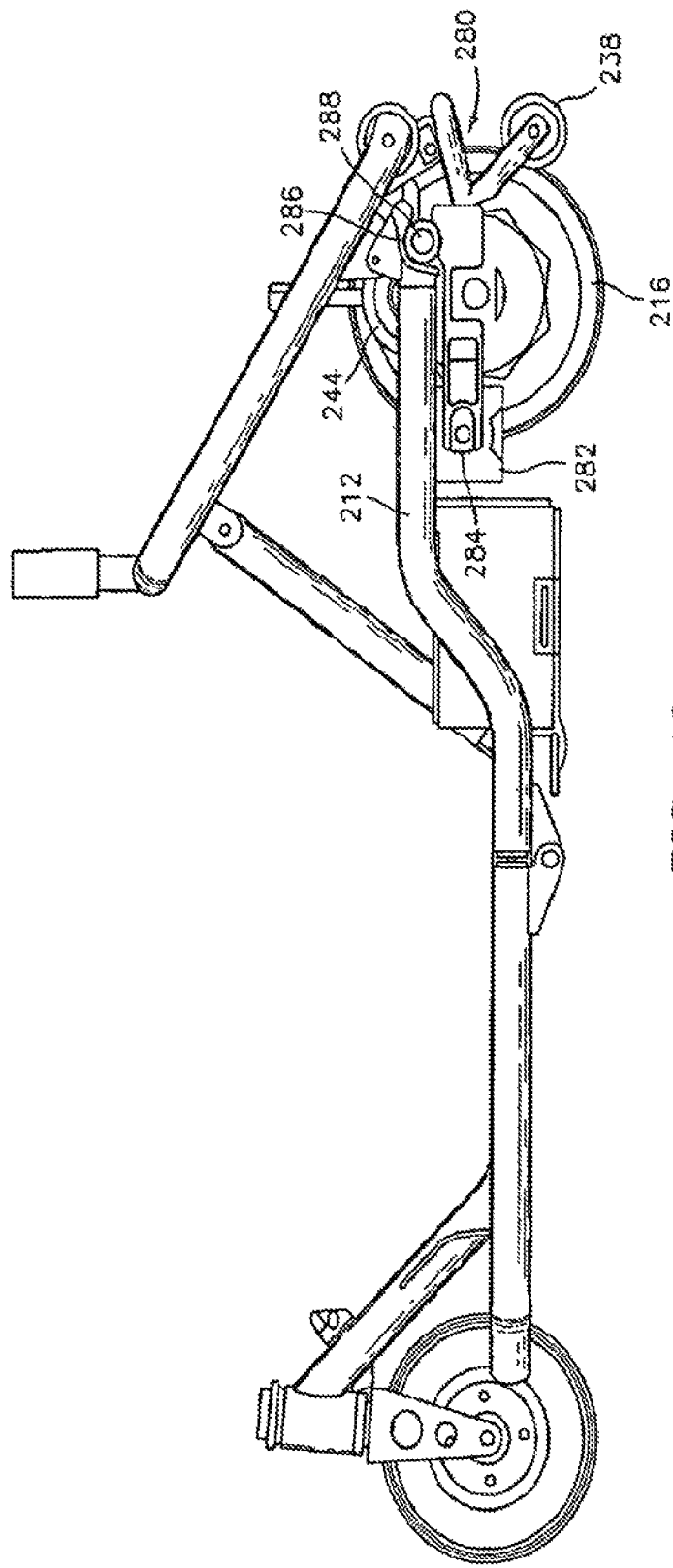
FIG. 10 is a side view of a collapsible vehicle frame having a pivotal rear transaxle on which are mounted the rear wheels and drive motors. One wheel has been removed to expose details of the axle.
Figure 11:
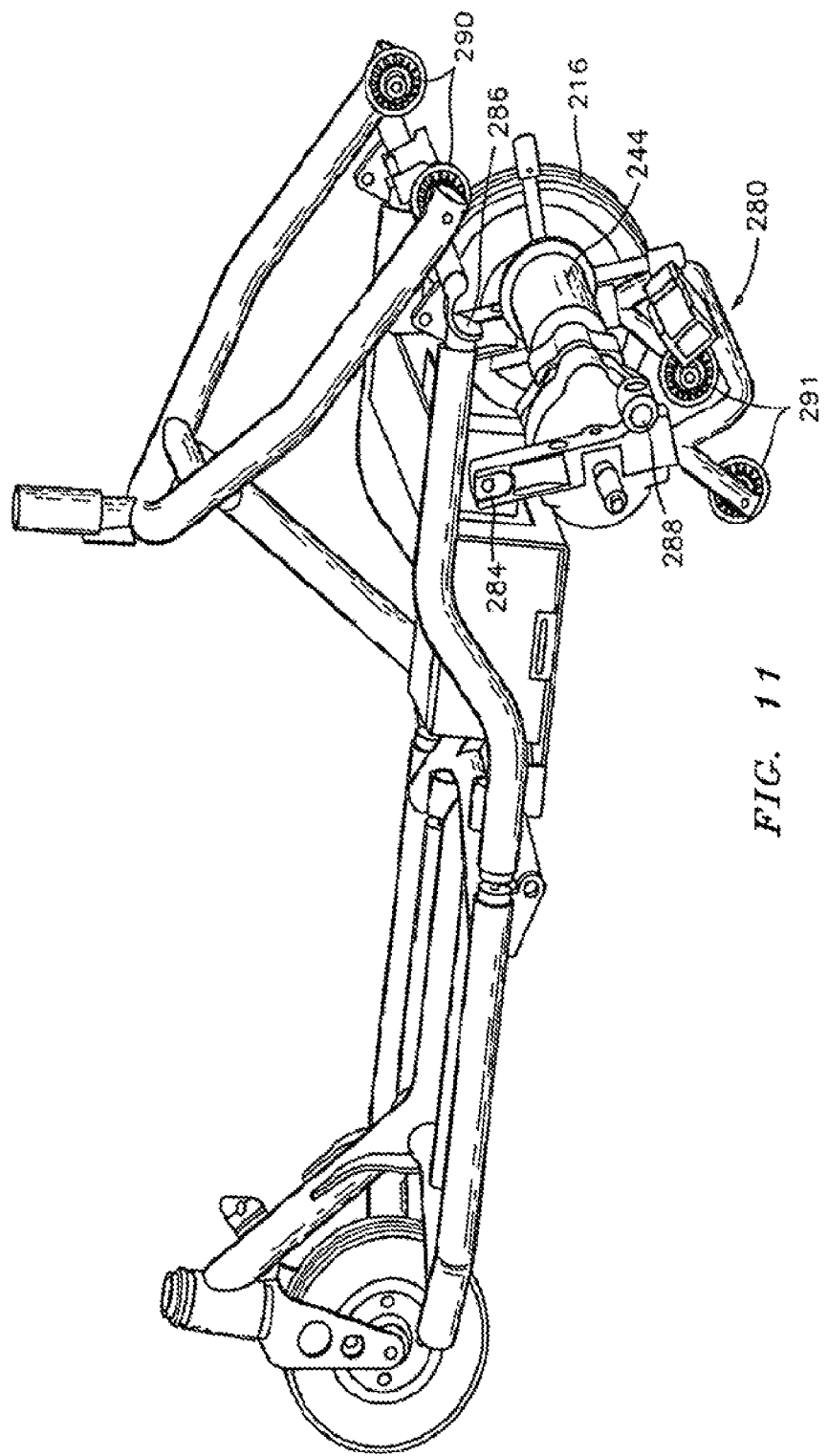
FIG. 11 is a view of the frame of FIG. 10 showing the transaxle pivoted away from the rear frame assembly.

FIGS. 10 and 11 depict another embodiment of a collapsible vehicle wherein the rear wheels 216, drive motor(s) and anti-tip rollers are mounted on a transaxle assembly 280 that is pivotally connected to the rear frame assembly, in which the transaxle can be unlatched and pivoted into the rear frame assembly to reduce the overall profile. The rear frame assembly 212 has on each side a urethane mounting block 282 to which an end 264 of the transaxle assembly is pivotally mounted. The rear wheels 216 and motor(s) 244 are mounted on a section of the transaxle axle assembly. The rear frame has a semi-circular channel 286 on each side to receive a hard rubber shock absorber 288 of the transaxle assemble when the rear wheels are resting on the ground and the front and rear frame assemblies are aligned in the normal use position. The transaxle may be locked in this position by any appropriate locking mechanism, such as intermeshing teeth discs 290, 291 on the rear frame and on the axle, as depicted in FIG. 11. The axle assembly may also have rear extensions on which are mounted the anti-tip rollers. When the intermeshing lock discs are loosened and moved apart so that the teeth no longer mesh, the transaxle assembly 280 can be pivoted to rest against the underside of the rear frame 212.

Figure 12:
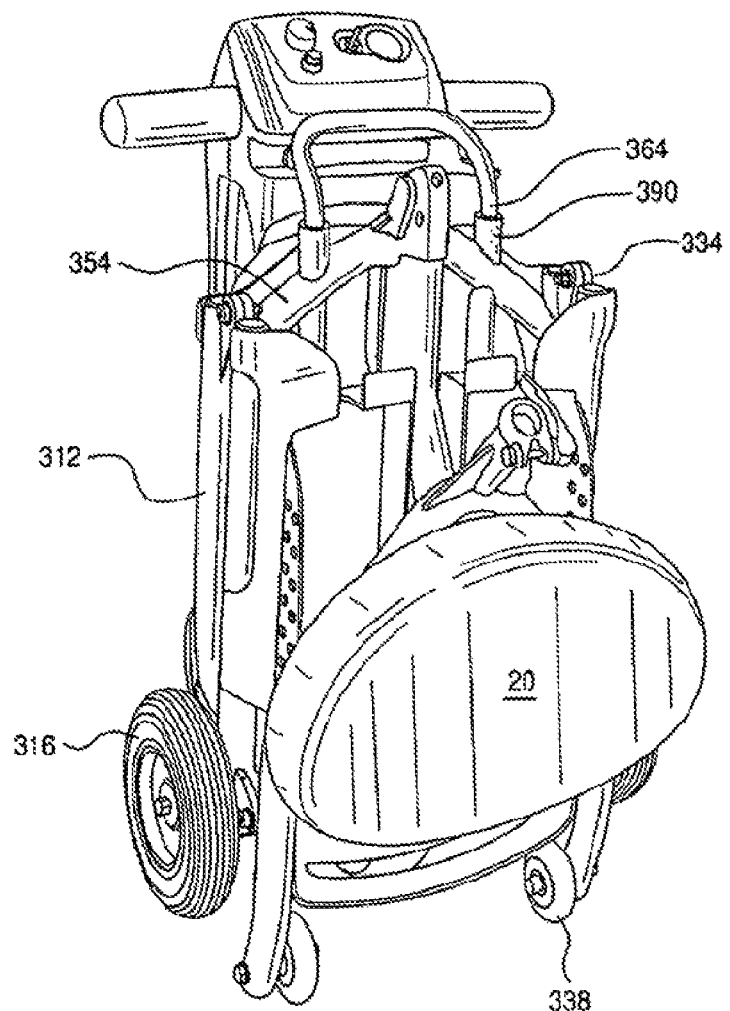
FIG. 12 is a view of a personal mobility vehicle with an extendable lift handle setting upright on its anti-tip rollers in its collapsed condition.
Figure 13:
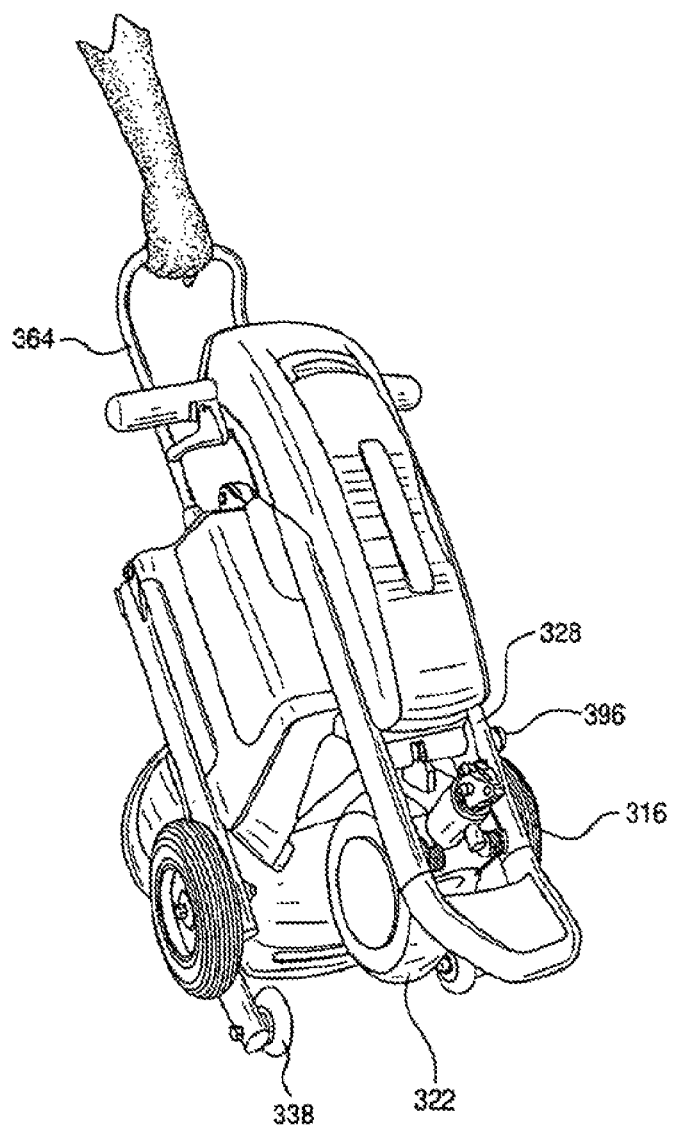
FIG. 13 is a view of the vehicle of FIG. 12 being towed on the anti-tip rollers.

Another aspect of the invention is shown in FIGS. 12 and 13. The lift handle 364 may have extended forks in tubes 390 in the rear frame assembly 354. After the vehicle is folded into its compact profile, the handle extension can be drawn out to full length and the handle 364 can be used to tow the folded vehicle on the anti-tip rollers, as shown in FIG. 13.

Figure 14:
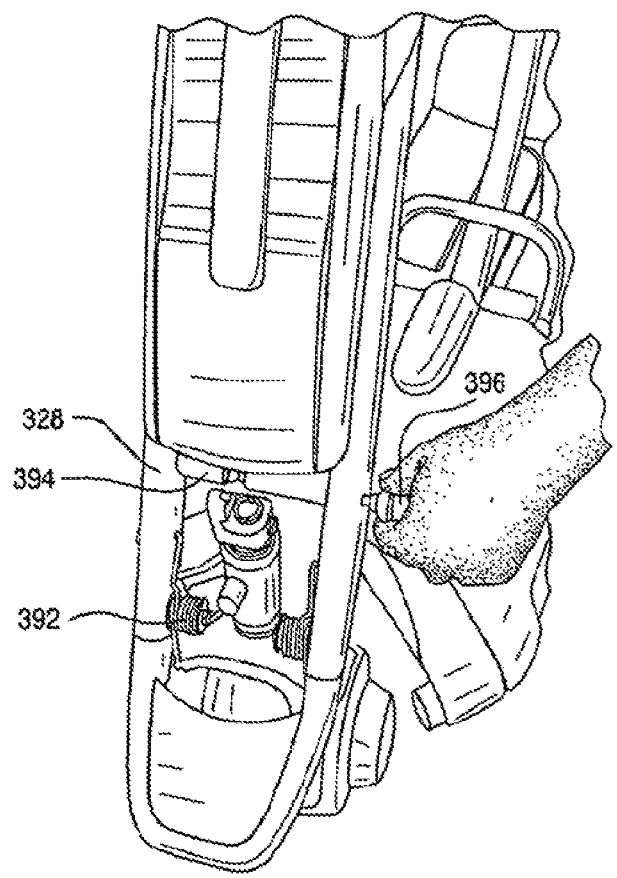
FIG. 14 is a view of a vehicle having a quick disconnect fitting between the steering tiller and the front steering wheel.

Another aspect of the invention is shown in FIGS. 13 and 14. The steering tiller 328 may be pivotally attached 392 to the front frame assembly and also be capable of easy disconnect from the front steering wheel assembly, as by the removable pin connection 394, 396 shown in FIG. 14. Once disconnected from the front wheel assembly 322, but still attached to the front frame assembly, the tiller 328 can be collapsed into the front frame assembly to provide a very compact profile for storage or transport.

Figure 15B:
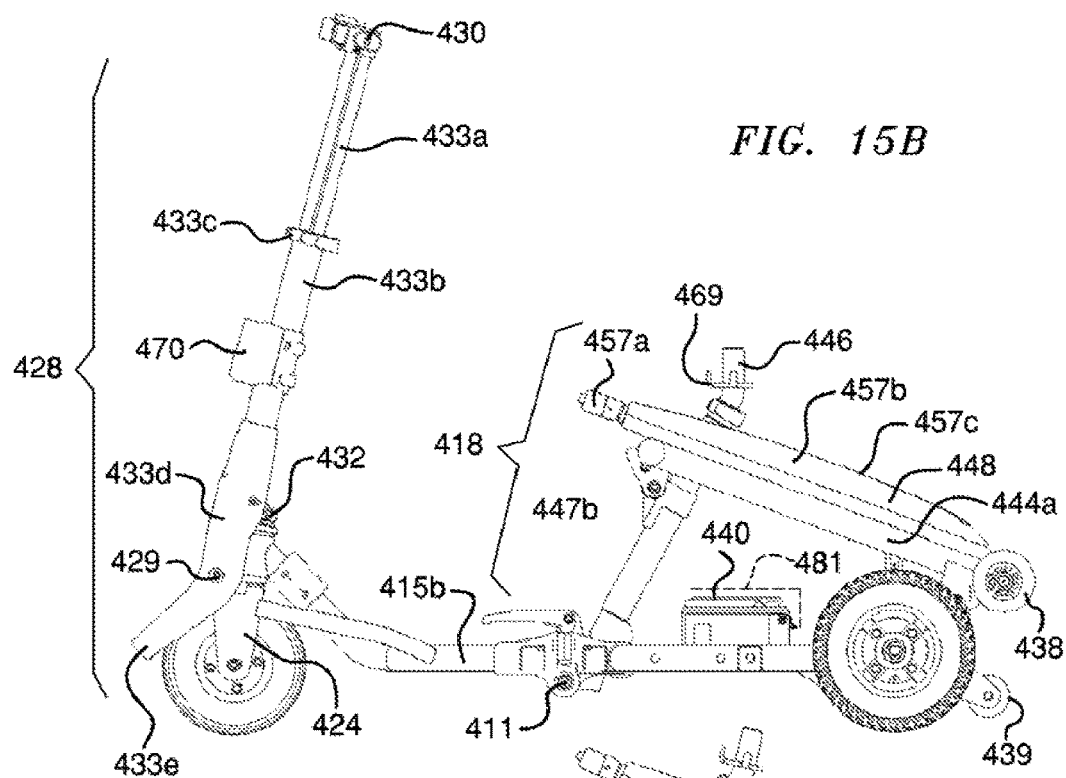
FIG. 15B is a side view of the vehicle shown in FIG. 15A.
Figure 16B:
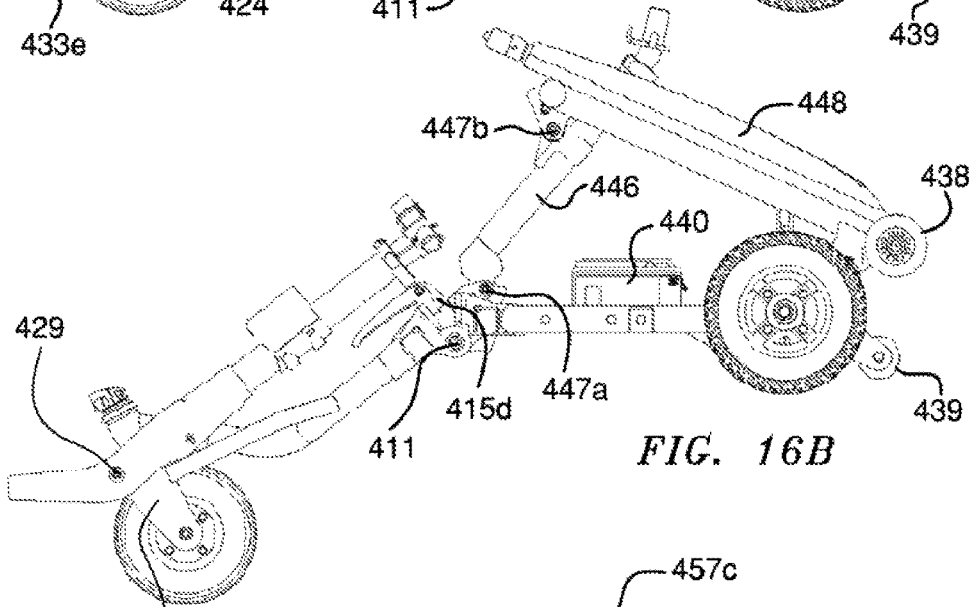
FIG. 16B is a side view of the vehicle shown in FIG. 16A.
Figure 17B:
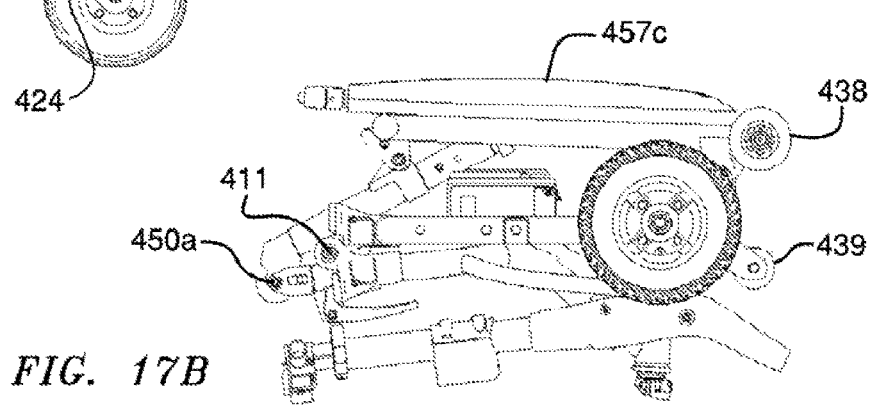
FIG. 17B is a side view of the vehicle shown in FIG. 17B.
Figure 18:
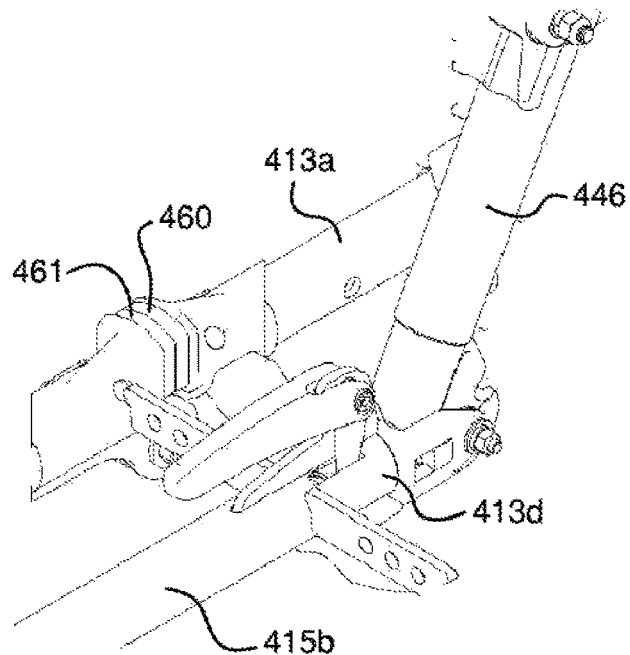
FIG. 18 is a perspective view of a latch shown in the operational configuration.

Referring to FIGS. 15A, 15B, 16A, 16B, 17A, and 17B to illustrate another embodiment, a vehicle 410 includes a foldable frame assembly having a rear frame assembly 412, a front frame assembly 414, and a main pivot 411 connected between the front and rear frames 412 and 414. Scooter 410 includes a pair of rear wheels 416, a seat frame 418, a front wheel 422, and a tiller assembly 428. The scooter has a longitudinal axis that is shown in FIGS. 15A and 17A.

Frames 412 and 414 preferable are formed of welded tubes. As best shown in FIG. 15A, rear frame 412 preferably includes a pair of opposing, longitudinal members 413a, a front cross member 413b, a rear cross member 413c, a battery compartment support 413d, and several support members 413e. Rear frame 412 is substantially parallel to the ground plane while the frame assembly is in its open position. Some of the frame members, including support members 413e, provide surfaces on which to attach a deck or cover, as will be understood by persons familiar with scooter technology. Battery compartment support 413e supports the battery compartment 481, which is described below.

Each forward end of the longitudinal rear frame members 413a includes a pressure plate 458, which preferably is formed of a rigid material. The free face of each pressure plate 458 of rear frame 412 faces forward and preferably contacts a corresponding rearwardly facing pressure plate 459 of front frame 414.

Front frame 414 is configured to support a cover or deck (which is omitted from FIG. 15A et seq. for clarity), and includes a pair of opposing, longitudinal members 415a, a central member 415b, a front member 415c, and an aft member 415d. Preferably, longitudinal members 415a are aligned with rear longitudinal members 413a so that pressure plate 458 and 459 are in contact when the scooter is in its fully open or operational position shown in FIGS. 15A and 15B. Main pivot 411 preferably is formed by a pair of hinges that are also located between longitudinal members 413a and 415a. In the embodiment shown in the figures, the main pivot forms a single axis, but the present invention encompasses configurations in which the frame includes additional pivots. Claims reciting a "main pivot" (without limitation) should be interpreted as encompassing additional pivot axes.

Central member 415b, front member 415c, and aft member 415d may be formed of a single tube, as shown in the figures. Aft member 415d may be a short section that extends rearwardly from the rear end of central member 415b. Front member 415c forms an angle such that its front end gradually elevates from the ground plane and terminates at a head bearing or head collar 417. A wheel fork 424 is attached to an outer portion of head 417 and downwardly extends to front wheel 422.

The tiller assembly 428 includes a handlebar 430, a telescoping portion 433a, a barrel 433b, a collar 433c, a fork 433d, and a front, standing portion 433e. As best shown in FIGS. 15A and 15B, telescoping portion 433a extends from barrel 433b and is held in its extended position by collar 433c. As used herein, the term "telescoping" refers any structure where one part is moveable relative to a fixed part and compasses one, two, or any other moveable parts. Collar 433c is releasable, such as by a cam, to enable telescoping portion 433a to slide into barrel 433b, as best shown in FIGS. 16A and 16B. Barrel 433b extends to tiller fork 433d, which is attached to wheel fork 424 by a pivot 429. Tiller 428 is held in its upward, operational position, as shown in FIGS. 15A and 15B, by a releasable pin or latch 432 of any design, as will be understood by persons generally familiar with scooter technology.

Seat structure 418 includes a front support member 446 and a rear support member 448. Seat front support member 446 is hinged or pivoted at its lower end at a pivot 447a to front frame aft member 415d, as shown for example in FIG. 16B. Front support member 446 is also hinged to rear support member 448 at a pivot 447b. Each one of the front seat support member 446 and rear seat support member 448 are oriented approximately parallel to the rear frame while the scooter is in its folded position Rear support member 448 includes a pair of structural main members 449a that preferably form an oblique angle relative to the ground plane while scooter 410 is in its open position. A pair of cross members 449c are connected between the main members to form a rigid structure. Each main member 449a of rear support member 448 is hinged at a pivot 449d to rear frame 412 either directly or with a rear drive assembly therebetween. A pair of rollers 438 is attached to a distal end of rear support member 448. Rollers 438 preferably are conventional, such as the type commonly used for rolling luggage or in-line skates. A pair of anti-tip rollers or wheels 439 are located on the distal end of rear frame 412.

Figure 26:
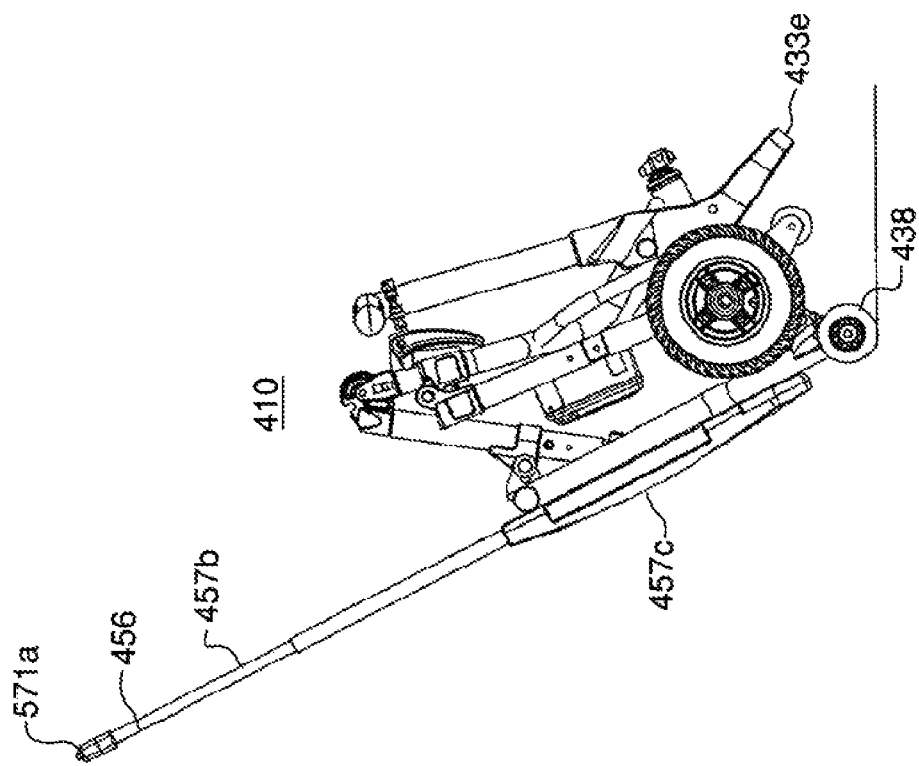
FIG. 26 shows the vehicle of FIG. 15A in its fully folded configuration, with the chair assembly removed for clarity.

An extendable handle assembly 456 is attached to support members 449a. Preferably, the handle assembly 456 and seat frame members 449a have approximately the same overall shape. Handle assembly 456 includes a handgrip 457a, a body 457b, a skid surface 457c, and telescoping shafts 457d. Handgrip 457a is attached to the telescoping shafts, which are shown in FIG. 26. Shafts 457d can be inserted into body 457b or extended to the operational or functional position by a user. The skid surface 457c is formed on the upper or outboard surface along the length of body 457b and preferably is formed of an abrasion resistant material, such as a commercially available thermoplastic.

A pair of opposing drives 444 are coupled to rear frame 412 and arranged in-line with the axis of rear wheels 416; the drive output shafts are collinear with the axes of the rear wheels 416. A gap is formed between the drives for receiving front wheel 422 when scooter 410 is in its fully folded position. The assembly of the drives 444 and rear wheels 416 is connected to rear frame 412 as will be understood by persons familiar with scooter design and manufacture.

Scooter 410 includes a pair of batteries 440 that are removably located in a recess or battery compartment 481 formed in a cover 499, as best shown in FIGS. 31, 32, 33, and 34. Cover 499 is located over rear frame 412. Each battery 440 includes a housing 482 having a rear tab 484a and a front tab 484b on a lower portion of each side, a handle 488 on its upper face, an electrical connector 490 on its front face, and a spring loaded pin 492, which is biased downwardly. Pin 492 is retracted when handle 488 is lifted, as best shown in FIGS. 24A, 24B, 25A, and 25B.

Figure 32:
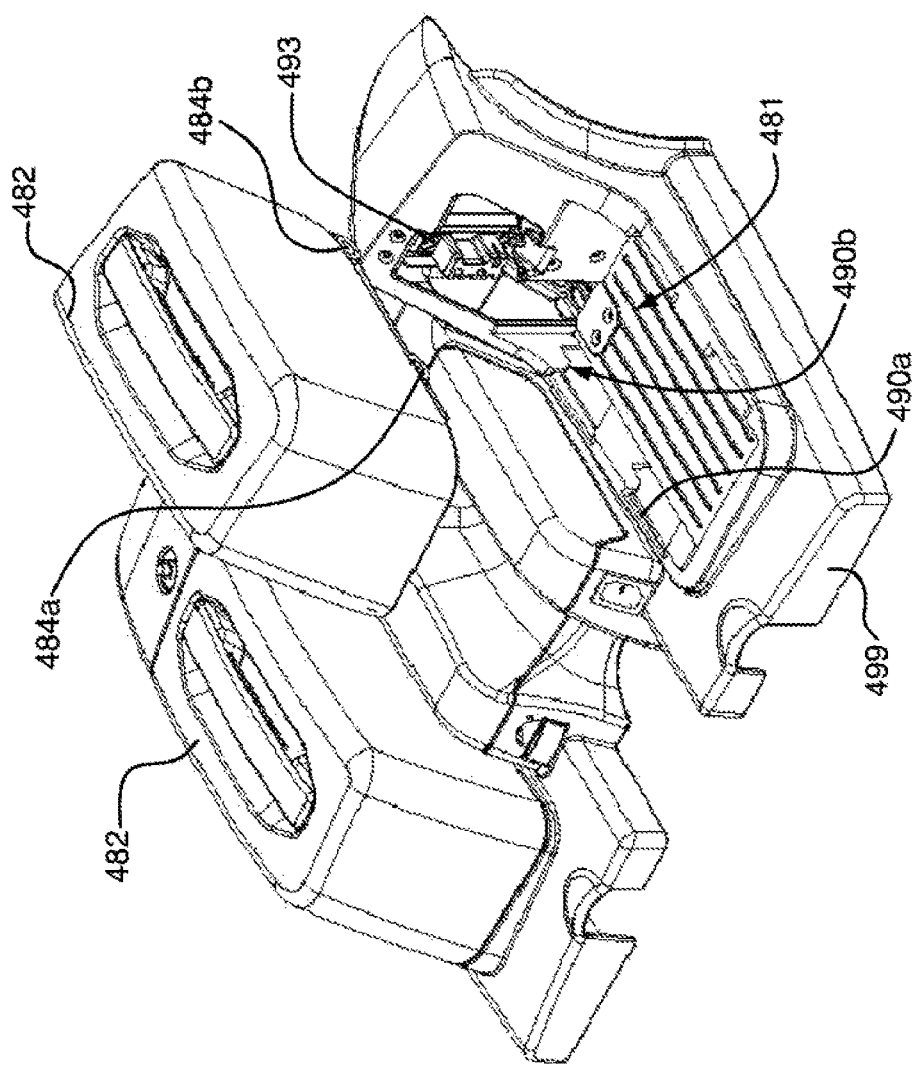
FIG. 32 is a perspective view of the battery compartment.
Figure 34:
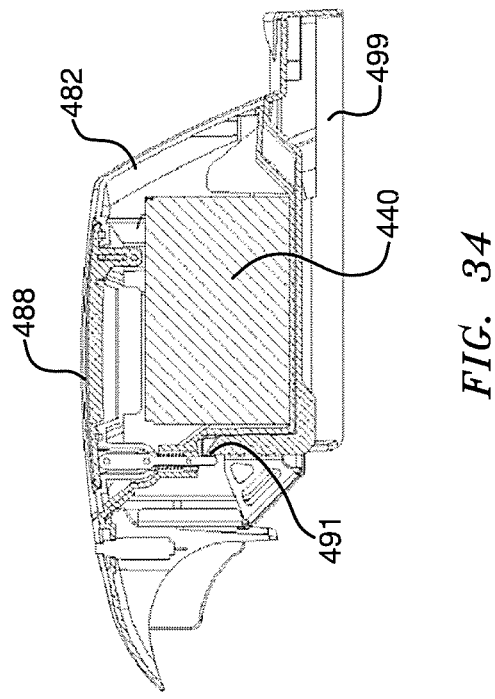
FIG. 34 is a cross section view taken through lines 34-34 in FIG. 33.
Figure 33:
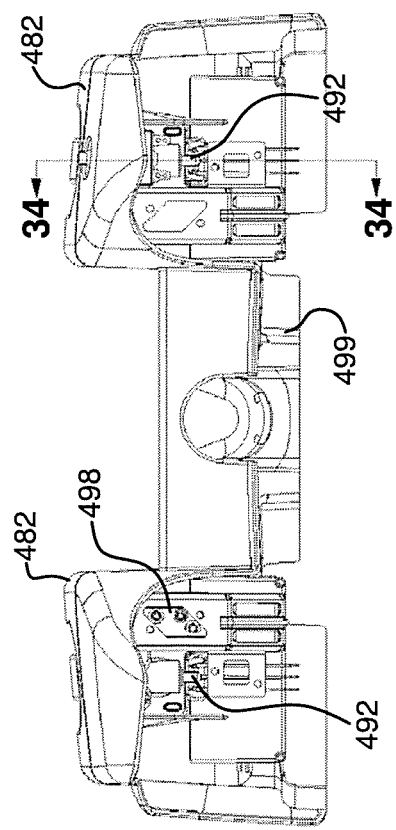
FIG. 33 is an end view of the batteries located in the battery compartment with some portions cut away for illustration.

Battery compartment 481 has a pair of grooves or recessed guides 490a and 490b and a recess or aperture 491. Preferably, scooter 410 includes a pair of rectangular battery compartments 481, as best shown in FIG. 32, that are located on opposing sides on longitudinal centerline generally under chair assembly 420. The structure is configured such that aperture 491 mechanically receives pin 492 of battery 440 when electrical connector 493 of compartment 481 mates to battery electrical connector 498, as best shown in FIG. 32.

Accordingly, while each battery 440 is attached to scooter 410, (i) connector 498 is coupled to a mating electrical connector 493 (shown in FIG. 32), which preferably is integrally formed into compartment 481, to electrically connect the batteries 440 to the controller and motors, (ii) spring loaded pin 492 is engaged into recess 491, and (iii) tabs 484a and 484b are located in the distal portions of guides 490a and 490b, respectively. Batteries 440 are retained in the battery compartments 481 while the scooter 410 is in its operational position shown for example in FIGS. 15A and 15B.

When the batteries are turned approximately 90 degrees (that is, when scooter 410 is oriented in its fully folded position and ready to be wheeled, as shown for example in FIG. 26), pin 492 is approximately horizontal and located in recess 491 to prevent movement of battery 440 in the negative x direction (which is approximately downward while the scooter is folded and resting) and tabs 484a and 484b prevent the battery from moving in the Z direction (which is approximately horizontal while the scooter is in the folded and position).

Battery 440 may be removed from the frame or cover by first lifting handle 488, which retracts pin 492 to disengage it from recess 491. Battery 440 may then be moved horizontally (as oriented in the open position) such that tabs 484a and 484b move horizontally in a portion of guides 490a and 490b, and then obliquely such that the tabs move in the angled portions of the guides or are free from the guides. The same removal process (relative to the scooter) may be performed while the scooter 410 is in its folded position.

As shown in FIG. 27, a chair assembly 420 includes a seat base 421a, a seat back 421b, and a pair of arm rest assemblies 421c. Seat back 421b extends upwardly from a rear portion of seat base 421a and preferably is hinged so that seat back 421b can be folded onto an upper face of seat base 421a. The arm rest assemblies 421c include an arm rest support 460 and an arm rest 461.

Figure 28:
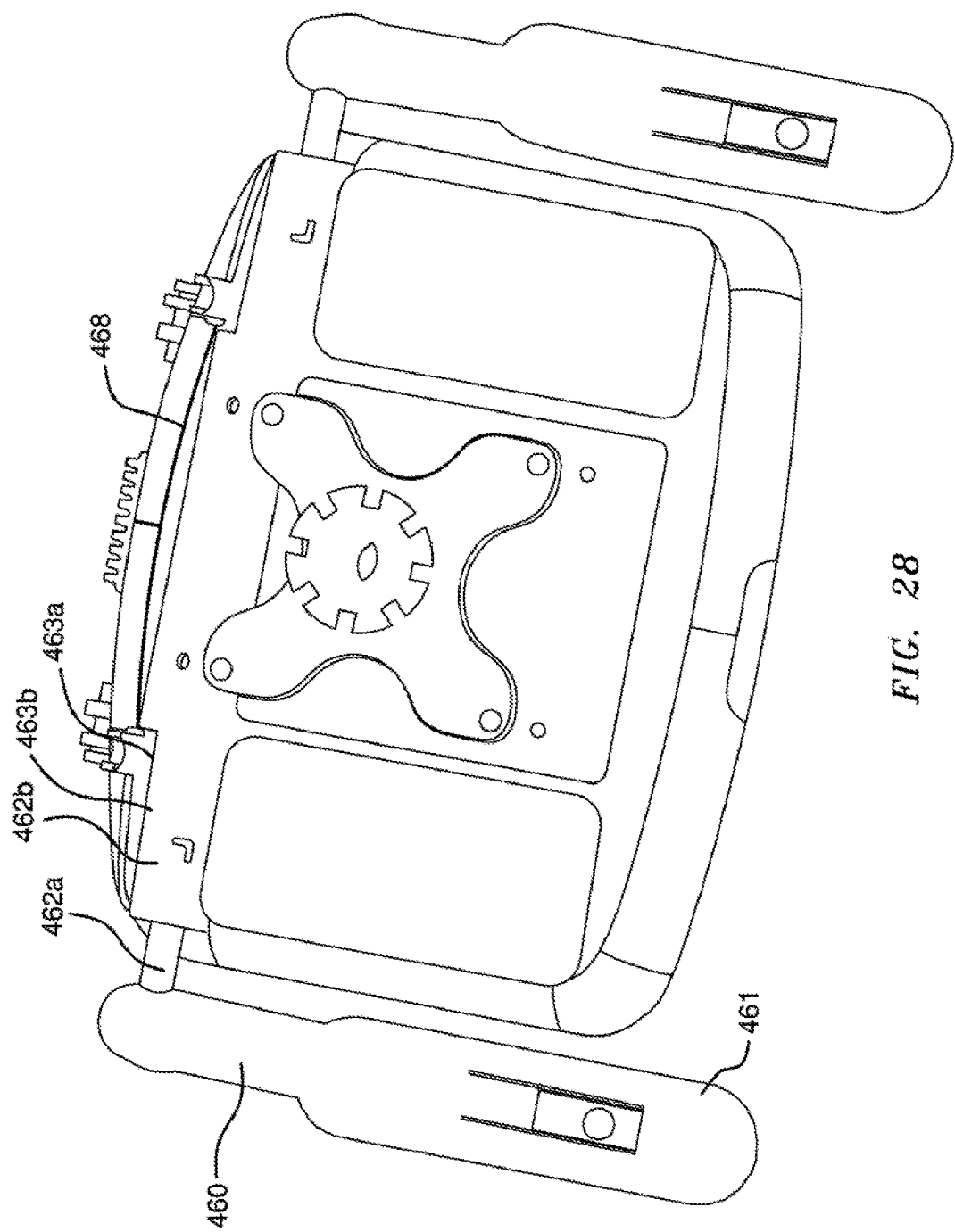
FIG. 28 is an enlarged perspective view of the underside of the seat assembly shown in FIG. 27.
Figure 31:
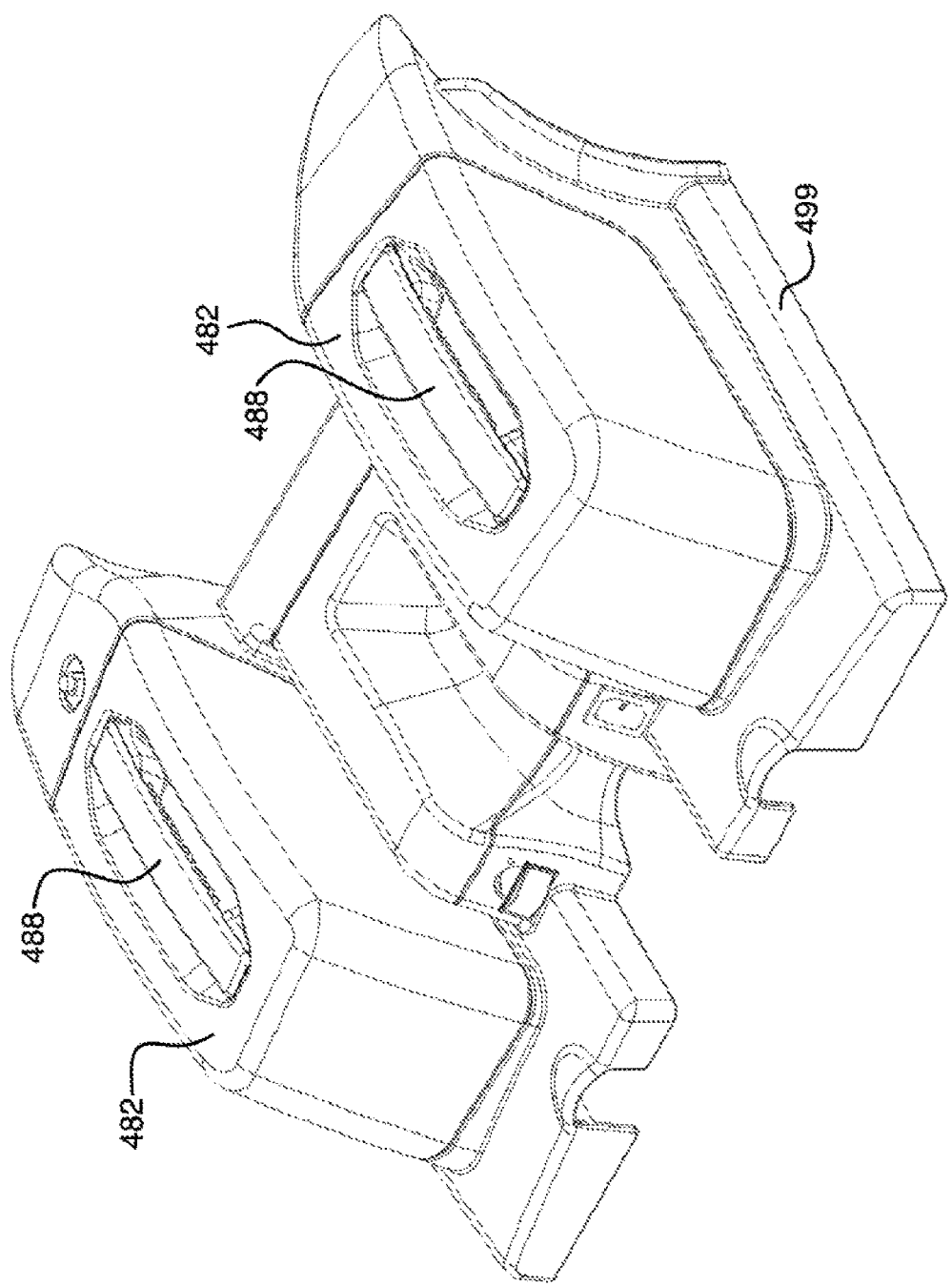
FIG. 31 is an enlarged perspective view of the batteries located in the battery compartments.

As shown in FIGS. 27 and 28, arm rests supports 460 preferably are rigidly connected to a pair of rods 462a that extend into brackets 463a on the underside of seat base 421a. Each bracket 463a has an L-shaped slot 463b that receives a pin 462b attached to the rods 462a. FIG. 28 illustrates the rods in their extended position such that slots 463b prevent pins 462b from rotating such that the slots retain arm supports 460 in the upright position shown in FIG. 27.

Arm rest supports 460 each include an upper pin 464a and a lower pin 464b that are transverse to the longitudinal axis L of scooter 410. Each arm rest 461 includes a bracket 466 that downwardly extends from the underside of the main portion or contact portion of the arm rest. As shown in FIG. 29, each bracket includes a slot 467a in its main body and a recess 467b at its lower end. Slot 467a receives arm rest upper pin 464a and recess 467b receives arm rest lower pin 464b to retain the arm rest 461 is in its secured, operational position.

To move arm rest assembly 421c from its secured, operational position shown in FIGS. 27, 28, and 29, a user may lift arm rest 461 upward such that upper pin 464a moves downward in slot 467a and lower pin 464b disengages with recess 467b, which positions are shown in dashed lines in FIG. 29. In its upward or extend position, arm rest 461 is rotatable relative to arm rest support 460 such that arm rest 461 is parallel and generally flat against arm rest support 461. And the arm rest supports 461 may be pushed inwardly toward seat base 421a until pins 462b are in position to ride in the longitudinal portion of slot 463b such that arm supports 460 are rotatable relative to seat base 421a. Accordingly, arm rest supports 460 and arm rests 461 may be rotated or folded to lie parallel to seat base 421a.

Seat base 421a includes a fixture or flange 468, generally referred to as a cloverleaf, attached to its underside. Flange 468 has tabs that engage corresponding tabs on a fixture 469 on seat frame front support 446 to removably attach chair 420 to seat frame 418. Tiller 428 includes a fixture 470 for receiving seat cloverleaf 468 while the chair assembly 420 is in its folded position. Accordingly, to move the chair assembly 420 from the operational position to the fully folded and transportable position, arm rests 461 and arm rest supports 460 are folded down and the seat is removed from the seat frame cloverleaf 469. Seat cloverleaf fixture 468 is inserted into the holder 470 where it is retained.

Figure 19:
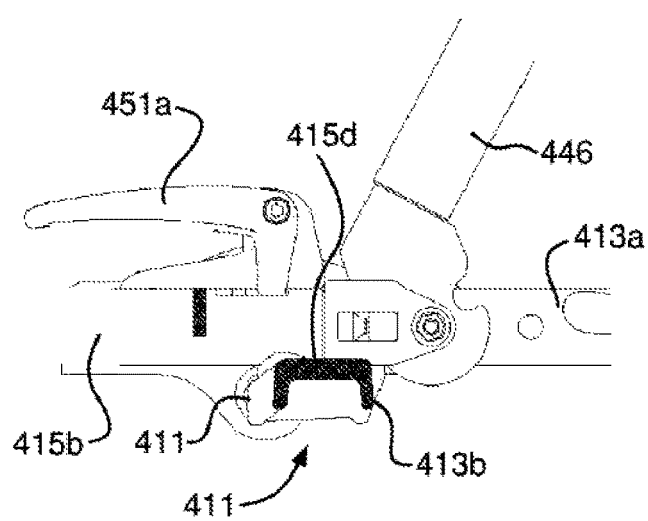
FIG. 19 is a side view of the latch of FIG. 18.
Figure 20A:
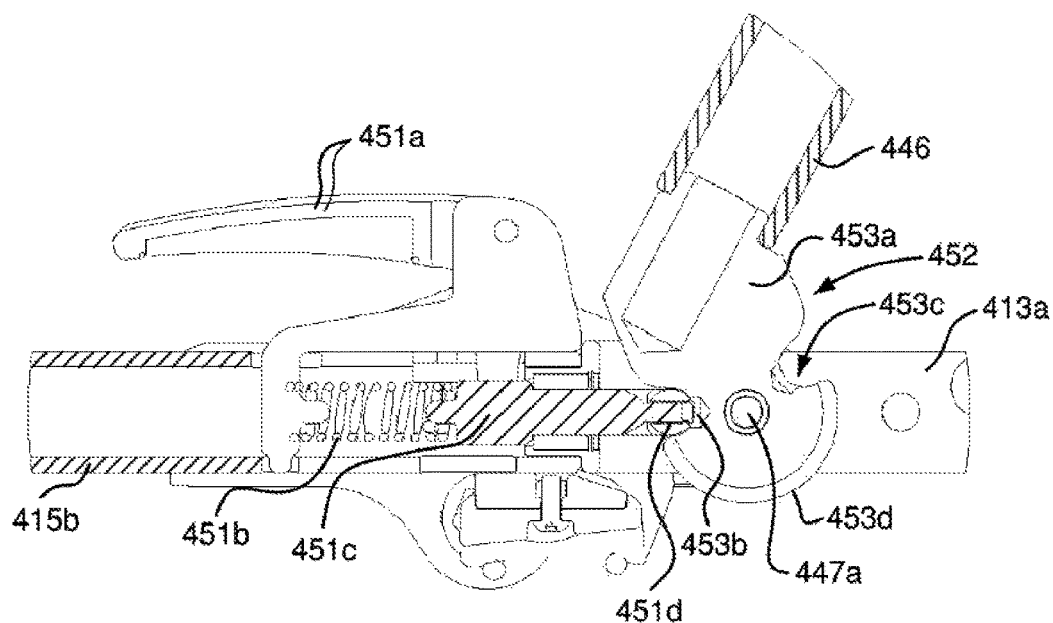
FIG. 20A is an enlarged cross sectional view of the latch of FIG. 19 shown in its operational position.
Figure 20B:
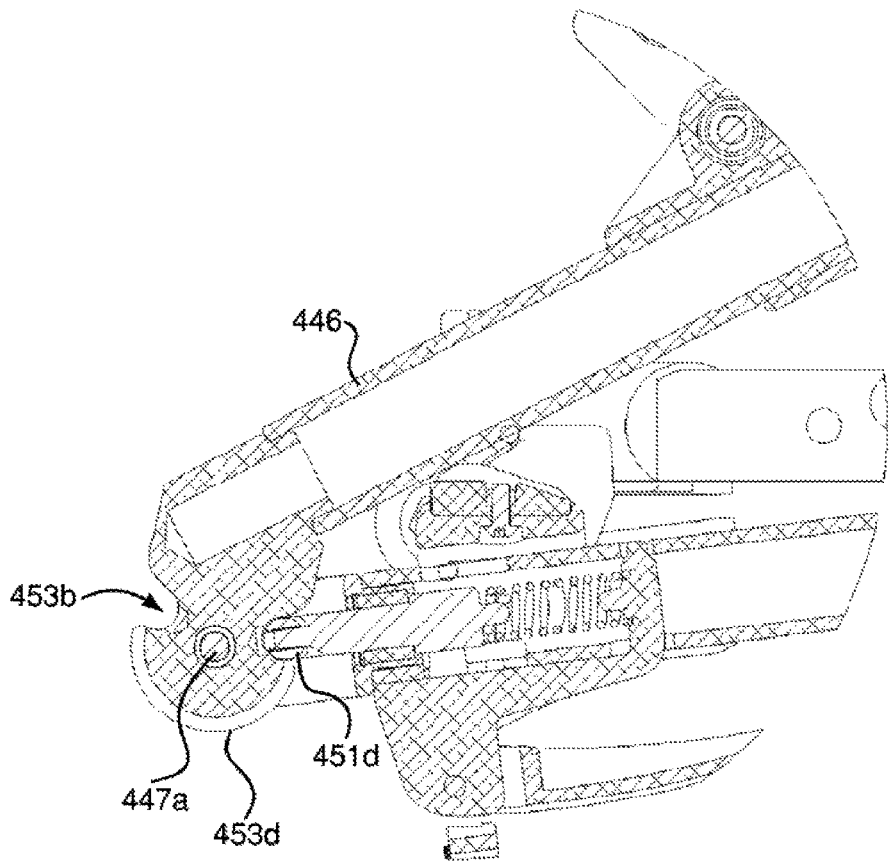
FIG. 20B is an enlarged cross sectional view of the latch of FIG. 19 shown in its folded configuration.
Figure 23:
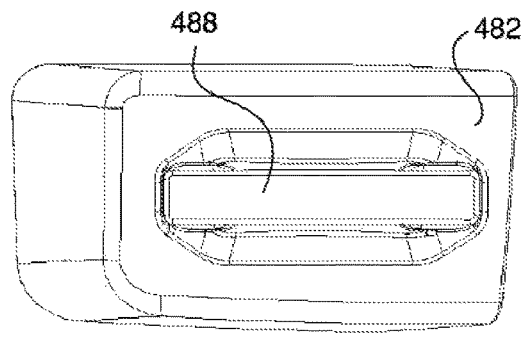
FIG. 23 is a top view of the battery unit.
Figure 22:
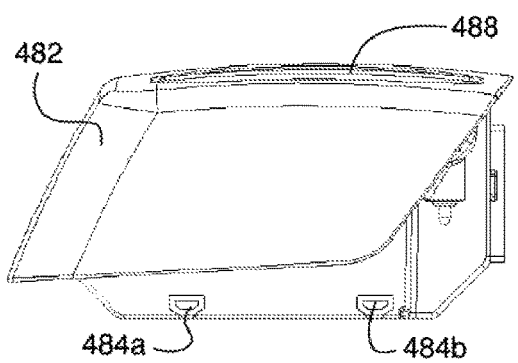
FIG. 22 is a side view of the battery unit of FIG. 21.
Figure 30:
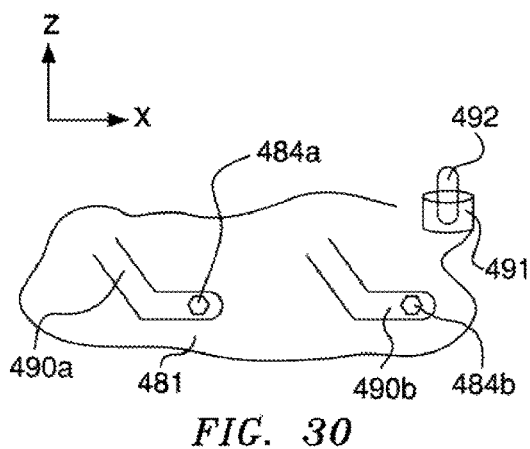
FIG. 30 is a schematic view of a portion of the cover.
Figure 21:
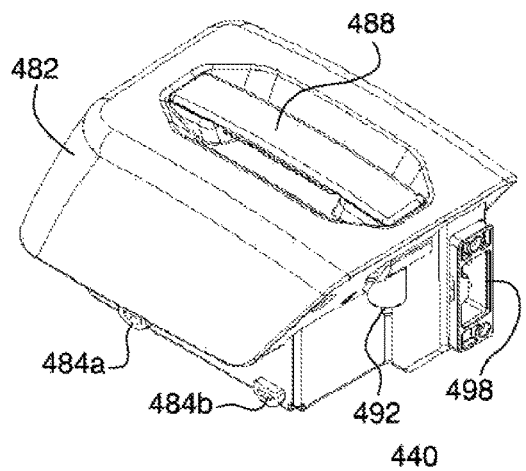
FIG. 21 is a perspective view of a battery unit.
Figure 24A:
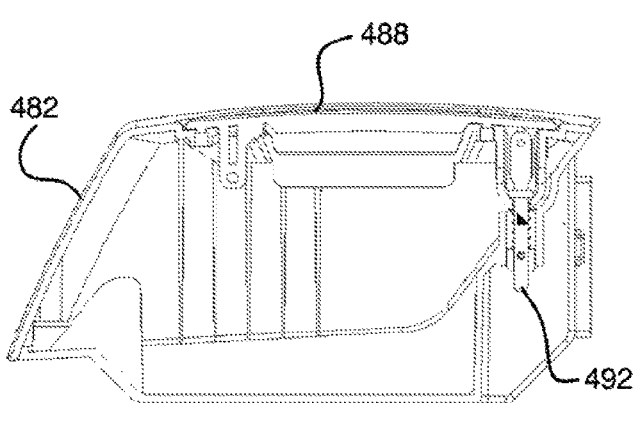
FIG. 24A is a side cross sectional view of a battery unit.
Figure 25A:
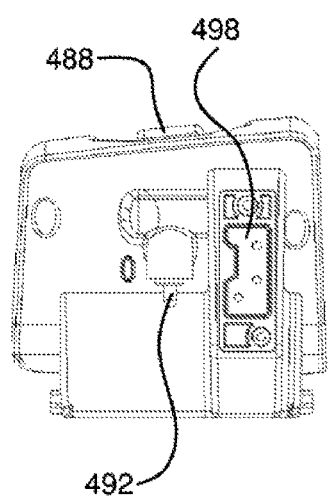
FIG. 25A is an end view of the battery unit of FIG. 24A.
Figure 24B:
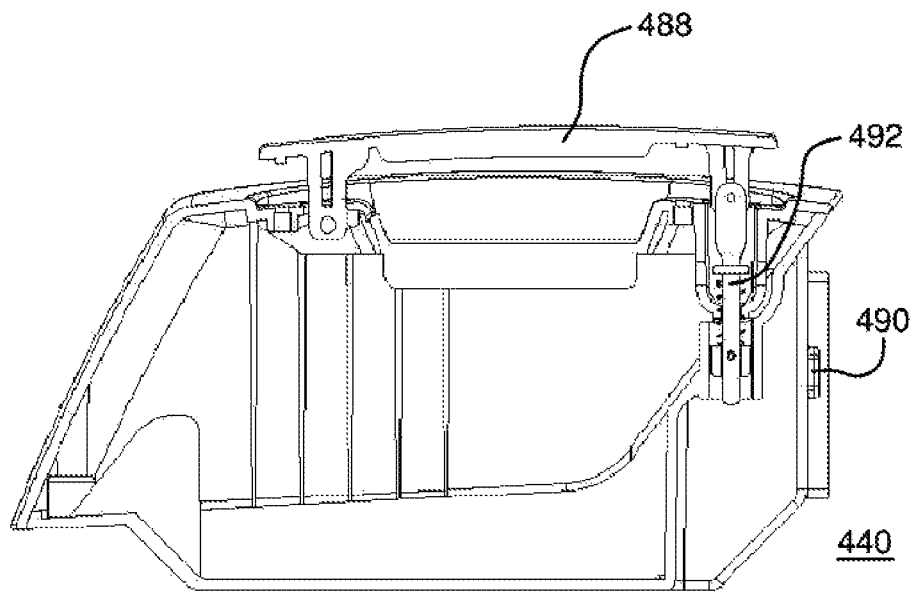
FIG. 24B is a side cross sectional view of the battery unit of FIG. 24A with its handle in the extended position.
Figure 25B:
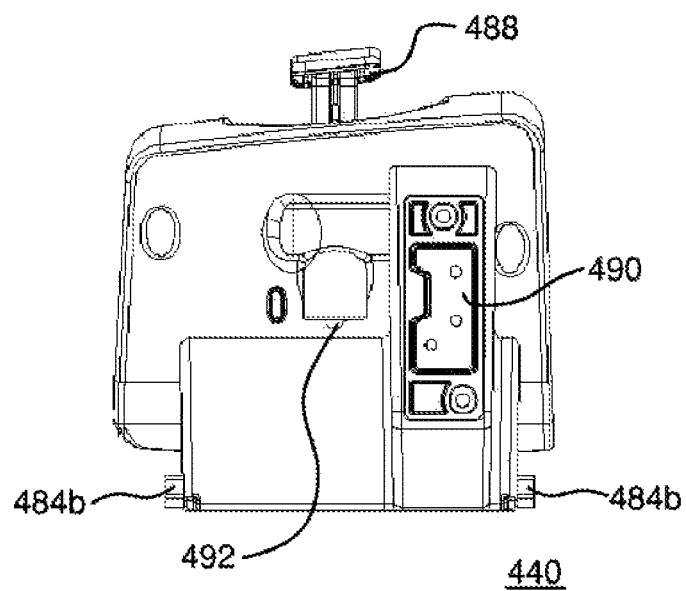
FIG. 25B is an end view of the battery unit of FIG. 24B with its handle in the extended position.

The latching and pivoting structure is shown in the assembly FIGS. 15A, 15B, 16A, 16B, 17A, 17B and in enlarged view in FIGS. 18, 19, 20A, and 20B. A latch mechanism 450 includes a latch handle 451a, a spring 451b, a rod 451c, and a pin 451d. Spring 451b and rod 451c preferably are oriented longitudinally while pin 451d is oriented transversely (that is, perpendicular to the longitudinal axis of the vehicle) and horizontally. Spring 451b biases rod 451c and pin 451d rearward (that is, to extend outward), as oriented in the operational position, such as is shown in FIGS. 19 and 20A. And actuating handle 451a causes the rod 451c and pin 451d to move forward (that is, retract). Front frame member 415c or aft member 415d has a slot for receiving a latch finger so that handle 451a can actuate pin 451d, such as by a simple linkage.

A clasp 452 is located on the lower end of seat frame member 446. Clasp 452 includes a body 453a, a forward recess 453b, a rear recess 453c, and a rolling or contact surface 453d. Secondary pivot 447a is formed partly in clasp body 453a. In the operational position shown in FIG. 20A, pin 451d is biased toward and disposed in forward recess 453b. In the fully folded position shown in FIG. 20b, pin 451d is biased toward and disposed in rear recess 453c.

To move vehicle 410 from its fully operational position to its fully folded position, a person may first release collar 433c and translate the telescoping portion 433a of the tiller into barrel 433b, and release the latch 432 holding tiller in its upright position to enable it to be pivoted clockwise (as oriented in FIG. 16B). Latch handle 451a may be actuated to disengage pin 451d from front recess 453b. After disengagement of the latch 411, rear frame 412 may be pivoted relative to front frame 414. Accordingly, a user may lift vehicle 410 at its (nominal) center by lifting latch handle 451a substantially vertically to draw the opposing ends of frame 412 and 414 together. As scooter 410 is moved through its partially folded configuration shown in FIGS. 16A and 16B, pin 451d slides or rolls over clasp contact surface 453d until scooter 410 reaches is fully folded position and pin 451d engages with rear recess 453c of clasp 452. The engagement of pin 451d and rear recess 453c retains scooter 410 in its folded position shown in FIGS. 17A, 17B, and 20B.

During the folding process, rear and front frame assemblies 412 and 414 pivot relative to one another about main pivot 411. As front frame members 415c and 415d move counterclockwise relative to pivot 411, secondary pivot 447a between forward frame aft member 415d and seat front member 446 is drawn clockwise relative to main pivot 411. The clockwise movement or forward movement of pivot 447a draws the lower end of seat front member 446 forward relative to rear frame assembly 412 (as the aft end of rear support 448 is directly or indirectly coupled to rear frame 412), which draws the rear support 448 clockwise such that the upper end of rear support 448 and the forward end of forward support 446 are drawn downwardly toward rear frame 412 until the seat frame and rear frame reach their resting configuration of the folded position. Accordingly, the position, in elevational or side view, of main pivot 411 relative to secondary pivot 447a, causes the seat frame 418 to be drawn into or collapse into rear frame 412 during the folding process. The figures, such as FIGS. 15B and 16B, show main pivot 411 located below secondary pivot 447a to enable the collapsing function. The present invention is not limited to any particular configuration, but rather encompasses any configuration that performs the collapsing function and as limited by the claims.

After scooter 410 reaches its fully folded position, handle 457a may be grasped and extended from its retracted position shown in figures. FIG. 26 illustrates scooter 410 in its fully folded position with handle 457a extended to be pulled by a user. In its folded, at-rest position, scooter 410 is supported by its pair of rollers 438 and standing portion 433e of tiller 428. In the folded position, as best shown in FIG. 17B there is preferably no gap between skid surface 457c and rollers 438 to enhance the motion of the scooter 410 over the nose of a stair tread while the scooter is being pulled up stairs. In this regard, a gap may enable the nose of a stair tread to dispose between a skid surface and rollers, which would require additional force by the user while ascending stairs.

To unfold scooter 410, as user may again actuate handle 451a to disengage pin 451d from recess 453c, which enable frames 412 and 414 to lower toward the open position, which lowering is aided by gravity. The seat frame extends upwardly in response to the movement of the main and secondary pivots 411 and 447a opposite to that described above. Tiller 428 may be pivoted and handle 430 may be translated to their up, operational positions and the chair 420 may be placed on the seat frame, and arm rest supports 460 and arm rests 461 may be put into their unfolded, operational or functional positions.

The drawings and description show particular forms which are presently preferred. It is contemplated that the invention could be embodied in other forms. Accordingly, reference should be made to the claims which follow to discern the full scope of the invention.

We claim:

1. A foldable scooter comprising:
   a foldable main frame assembly including a front frame and a rear frame coupled to the front frame at a pivotal connection such that at least one of the front frame and the rear frame is pivotable relative to the other between (i) an open position and (ii) a folded position whereby bottom surfaces of the front and rear frames are drawn toward each other, wherein a portion of the rear frame and a portion of the front frame connected to the portion of the rear frame at the pivotal connection are mutually substantially parallel to a ground plane and support a deck thereon when the main frame assembly is in the open position;
   at least one front wheel operably coupled to the front frame;
   a tiller coupled to the front frame; and
   a seat frame including at least one rear support member and at least one front support member, wherein the at least one front support member is pivotably coupled to the at least one rear support member at a pivot that is fixed relative to the at least one rear support member,
   wherein the at least one rear support member is pivotably coupled to the main frame assembly at a rear support pivot that is spaced apart from and independent from the pivotal connection between the front frame and the rear frame, and the at least one front support member is pivotably coupled to the main frame assembly at a front support pivot that is spaced apart from and independent from the pivotal connection between the front frame and the rear frame, such that actuating the frame assembly from the open position to the folded position draws at least a portion of the at least one front support member toward the rear frame and draws at least a portion of the at least one rear support member toward the rear frame.

2. The scooter of claim 1, wherein the rear frame is pivotably coupled to the front frame at a main pivot.

3. The scooter of claim 1, further comprising a hinged connection that is pivotably coupled to the front frame, wherein the at least one front support member is pivotably coupled to the hinged connection.

4. The scooter of claim 1, wherein the at least one front support member is pivotably coupled to the front frame.

5. The scooter of claim 1, wherein the front frame is substantially parallel to the rear frame when the main frame assembly is in the folded position.

6. The scooter of claim 1, further comprising a pair of rear wheels operably coupled to the rear frame.

7. The scooter of claim 1, wherein the pivot is positioned forward of the rear support pivot when the main frame assembly is in the open position.

8. The scooter of claim 1, wherein the tiller has a handlebar and is coupled to the front frame at a tiller pivot, wherein the tiller is configured to pivot about the tiller pivot from an operational position to a folded position, where the handlebar is furthest from the pivotal connection in the operational position and closest to the pivotal connection in the folded position.

9. The scooter of claim 1, wherein the tiller has a handlebar for rotating the front wheel about a first axis to steer the scooter, and the tiller is coupled to the front frame at a tiller pivot for pivoting the tiller about a second axis that is substantially perpendicular to the first axis.

10. The scooter of claim 1, wherein the front frame has a first side and a second side laterally opposite the first side, wherein the front frame is configured to support the deck between the first and second sides.

* * * * *